(12) United States Patent
Itou et al.

(10) Patent No.: US 6,346,974 B1
(45) Date of Patent: Feb. 12, 2002

(54) LIQUID CRYSTAL DISPLAY DEVICE

(75) Inventors: Osamu Itou; Shinichi Komura, both of Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/431,072

(22) Filed: Nov. 1, 1999

(30) Foreign Application Priority Data

Oct. 30, 1998 (JP) ............................................. 10-309839

(51) Int. Cl.[7] ...................... G02F 1/1347; G02F 1/1335
(52) U.S. Cl. .......................... 349/79; 349/121; 349/165; 349/175
(58) Field of Search ............................. 349/78, 79, 113, 349/117, 121, 165, 175, 179, 43

(56) References Cited

U.S. PATENT DOCUMENTS

| | | | |
|---|---|---|---|
| 5,798,809 A | * | 8/1998 | Nakamura et al. ........... 349/165 |
| 5,926,242 A | * | 7/1999 | Kataoka et al. ............. 349/117 |
| 6,061,111 A | * | 5/2000 | Kataoka et al. ............. 349/165 |

FOREIGN PATENT DOCUMENTS

| | | |
|---|---|---|
| JP | A-8-286214 | 11/1996 |
| JP | B-2608661 | 2/1997 |
| JP | A-9-90431 | 4/1997 |
| JP | A-9-152630 | 6/1997 |
| JP | A-10-62773 | 3/1998 |
| JP | A-10-82986 | 3/1998 |
| JP | A-10-104565 | 4/1998 |

OTHER PUBLICATIONS

"Optical patterning of multidomain liquid–crystal displays with wide viewing angles", NATURE, vol. 381, 16 May, 1996, pp. 212–215.
"In–situ photopolymerization of oriented liquid–crystal–line acrelates, 4", Mahromol. Chem. 190, 3201–3215, 1989.

* cited by examiner

Primary Examiner—William L. Sikes
Assistant Examiner—Tai V. Duong
(74) Attorney, Agent, or Firm—Antonelli, Terry, Stout & Kraus, LLP

(57) ABSTRACT

A retardation film type guest host liquid crystal display is arranged to reduce coloring in dark representation and to be energy-effective. The liquid crystal display includes a liquid crystal layer containing a given amount of dichroic dye and having a twist alignment, a reflective plate, and a phase plate located between the liquid crystal layer and the reflective plate. The phase plate has a slow axis set at 45 degrees against the alignment direction of the liquid crystal and a retardation set at a half of a phase difference between an ordinary ray before reflection by said reflective plate and an extraordinary ray after reflection.

10 Claims, 17 Drawing Sheets

80···RUBBING ROLL

LIQUID CRYSTAL DISPLAY DEVICE

BACKGROUND OF THE INVENTION

Today, every kind of electric device is being rapidly made multifunctional. For smoothly manipulating a multifunctional electric device, the significance of an interface is being increased as well. The liquid crystal display device (simply referred to as a liquid crystal display) is thin, lightweight, and energy-effective, so that it may be mounted on such a multi-functional electronic device without greatly changing the form of the electric device. Hence, the liquid crystal display is the most approximate to an interface provided in every kind of electric device.

A reflective liquid crystal display is arranged to reflect ambient light with a reflective plate for displaying an image without using a back light. Hence, the reflective liquid crystal display is far more energy-effective, thinner, and more lightweight among all kinds of liquid crystal displays. The field of utilization to which the present invention applies concerns with the reflective liquid crystal displays.

A guest host liquid crystal display does not employ a polarizer, so that it has a high efficiency of utilizing light. The application of this type liquid crystal display to the reflective liquid crystal display makes it possible to obtain a display with a high reflection factor. The guest host liquid crystal display may be divided into several types, one of which is a retardation film type guest host liquid crystal display.

For describing the display principle of the retardation film type guest host liquid crystal display, at first, the description will be oriented to the guest host liquid crystal display with no phase plate to be compared with the subject display with reference to FIG. 2. The guest host liquid crystal display shown in FIG. 2 is arranged so that a liquid crystal layer 15 has a twist angle of 0. The ray of light incident to the liquid crystal layer is decomposed into two optical eigen modes and then propagated through the liquid crystal layer. If the liquid crystal layer has a twist angle of 0, these two eigen modes are linear ones whose vibrating directions are perpendicular to each other. The ray whose vibrating direction is in parallel to the alignment direction of the liquid crystal is called extraordinary rays 43 and 45, while the ray whose vibrating direction is perpendicular to the alignment direction thereof is called ordinary rays 44 and 46.

A dichroic dye, on the average, has an alignment direction that is equal to that of the liquid crystal layer. Hence, if the liquid crystal layer has a twist angle of 0, for example, the extraordinary ray has an absorption coefficient $\alpha_e$ of 0.3 $\mu m^{-1}$ and the ordinary ray has an absorption coefficient $\alpha_o$ of 0.035 $\mu m^{-1}$. The extraordinary ray 47 is sufficiently absorbed by the liquid crystal layer, while the ordinary ray 48 is hardly absorbed thereby. It means that lack of the polarizer results in lowering a contrast ratio.

The arrangement and the display scheme of the retardation film type guest host liquid crystal display are illustrated in FIG. 3. The retardation film type guest host liquid crystal display includes a phase plate built inside of a liquid crystal cell. It means that a phase plate 33 is laid between a liquid crystal layer 15 and a reflective electrode 30.

In the conventional retardation film type guest host liquid crystal display, the phase plate has a retardation of a quarter wave. That is, if the liquid crystal layer has a twist angle of 0, a phase difference between the extraordinary ray 44 in incidence and the ordinary ray 33 after reflection is a half wave. While the ray is passed through the phase plate twice, the ordinary ray in incidence is converted into the extraordinary ray after reflection. Hence, the retardation of the phase plate is made a half of a half wave, that is, a quarter wave.

The ordinary ray 50 is hardly absorbed in the liquid crystal layer and is incident to the phase plate. After the ordinary ray 50 is passed through the phase plate, it is converted into a circularly polarized light 48. Then, the circularly polarized light 48 is reflected on a reflective layer. Next, the circularly polarized light 48 is converted into the extraordinary ray 33 while it is passed through the phase plate again. Since the ordinary ray that has been hardly absorbed in incidence is sufficiently absorbed after reflection (50), the reflection factor in dark representation is made sufficiently lower.

The retardation film type guest host liquid crystal display is described in JP-AP-8-286214, JP-A-9-90431, JP-A-9-152630, JP-A-10-62773, JP-A-10-82986, and JP-A-10-104565, for example.

The retardation film type guest host liquid crystal display has a problem that the dark representation is colored in purple. The ground therefor is shown in FIG. 4. The wavelength dispersion of the retardation of an ideal phase plate is shown by a broken line of FIG. 4. In case the liquid crystal layer has a twist angle of 0, the polarization shown in FIG. 3 is executed over the overall visible wavelength if the retardation of the phase plate is a quarter wave over an overall visible wavelength.

However, the retardation of the phase plate is decreased with increase of the wavelength as shown by a solid line of FIG. 4. Hence, the broken line is crossed with the solid line merely at one point of the visible wave area. FIG. 4 shows the case both are arranged to coincide with each other at a wavelength of 550 nm where the relative luminous efficiency becomes maximum. Strictly, the polarization shown in FIG. 3 is established only at a wavelength of 550 nm where the broken line coincides with the solid line.

On both ends of the visible wave area where the broken line is far away from the solid line, the polarization shown in FIG. 3 is not established, so that the reflection factor of dark representation is not made sufficiently low. The reflective spectrum of the dark representation at that time indicates that the reflection factor is increased mainly in red and blue as shown by a solid line (thin line) of FIG. 5. Hence, the dark representation is colored in purple.

Further, the retardation film type guest host liquid crystal display also has a problem that the driving voltage is increased. That is, in the retardation film type guest host liquid crystal display, as shown in FIG. 3, a phase plate is located between the liquid crystal layer and the electrode, so that the liquid crystal layer and the phase plate are aligned in series with respect to an electric field. Hence, the voltage to be applied to the liquid crystal layer is made lower by the application of a voltage to the phase plate. In order to obtain a sufficient reflection factor and contrast ratio, it is necessary to increase the driving voltage by the value applied to the phase plate.

SUMMARY OF THE INVENTION

An object of the present invention is to solve a problem of coloring dark representation in a retardation film type guest host liquid crystal display and make the display more energy-effective.

According to the present invention, a given amount of chiral dopant is added to a liquid crystal layer for making the structure of the liquid crystal layer twist alignment.

In a case that the alignment direction is turned clockwise from the second substrate located farther to the first substrate when the alignment direction of the liquid crystal layer is observed from the axial direction of the twist, the phase plate is formed so that the slow axis is located about 45 degrees counterclockwise against a closer alignment direction of the liquid crystal layer. In a case that the alignment direction is turned counterclockwise from the second substrate to the first substrate, the phase plate is formed so that the slow axis is located about 45 degrees clockwise against a closer alignment direction to the liquid crystal layer. The definition of about 45 degrees is ranged within 45 degrees ±5 degrees because a great difference takes place through the effect of the present application even if the phase plate is shifted about ±5 degrees.

The retardation of the phase plate is set according to the pitch of the twist alignment of the liquid crystal layer, which is described as follows. If the helical pitch of the liquid crystal layer is 12 μm or larger but 16 μm or smaller, the retardation of the phase plate is set in the range of 55 nm or larger but 100 nm or smaller. If the helical pitch of the liquid crystal layer is 10 μm or larger but 12 μm or smaller, the retardation of the phase plate is set in the range of 45 nm or larger but 90 nm or smaller. If the helical pitch of the liquid crystal layer is 8 μm or larger but 10 μm or smaller, the retardation of the phase plate is set in the range of 35 nm or larger but 80 nm or smaller. If the helical pitch of the liquid crystal layer is 6 μm or larger but 8 μm or smaller, the retardation of the phase plate is set to the range of 25 nm or larger but 65 nm or smaller.

Assuming that the retardation of the phase plate is $\Delta nd_{ph}$, the retardation should be set to the value defined by the expression (1) according to the pitch p of the twist alignment of the liquid crystal layer.

$$\Delta nd_{ph} = \lambda \cos^{-1}\{E_{x1,2}E_{y1,2}/(E_{x1,2}^2+E_{y1,2}^2)\}/360 \quad (1)$$

$$E_{x1,2}/E_{y1,2} = 2\, m_{1,2}(\lambda/p)/\{n_e^2 - m_{1,2}^2 - (\lambda/p)^2\} \quad (2)$$

$$m_{1,2}^2 = (\lambda/p)^2 2 + 0.5(n_e^2 + n_o^2) \pm \{2(\lambda/p)^2(n_e^2 + n_o^2) + 0.25(n_e^2 - n_o^2)^2\}0.5 \quad (3)$$

wherein $\lambda$ is a wavelength of a transmitted ray, $n_e$ and $n_o$ are a refractive index of extraordinary ray and a refractive index of ordinary ray, $E_{x1,2}$ is an electric vector whose vibrating direction is in parallel to the alignment direction of the liquid crystal layer, and $E_{y1,2}$ is an electric vector whose vibrating direction is perpendicular to the alignment direction thereof, a phase difference between which is $\pi/2$.

In a case that the guest host liquid crystal display employs a subtractive mixture of color stimuli that needs a lamination of three liquid crystal layers for presenting cyan, yellow, and magenta, the substrates and the liquid crystal layers are numbered in a closer sequence as viewed from a user, such as a first substrate, a second substrate, a third substrate, a fourth substrate, a first liquid crystal layer, a second liquid crystal layer, and a third liquid crystal layer. The phase plate is formed between the third liquid crystal layer and the fourth substrate and the helical pitches and the twist directions of the liquid crystal layers are set to be substantially identical with one another. Further, the alignment direction of the liquid crystal layers are made in parallel to one another on a vicinal plane. Concretely, the alignment direction of the contacting side of the first liquid crystal layer with the second liquid crystal layer is set in parallel to the alignment direction of the contacting side of the second liquid crystal layer with the first liquid crystal layer. Likewise, the alignment direction of the contacting side of the second liquid crystal layer with the third liquid crystal layer is set in parallel to the contacting side of the alignment direction of the third liquid crystal layer.

Next, the description will be oriented to the function. If the retardation of the phase plate is shifted out of the ideal condition, the coloring in dark representation may be reduced even if the reflection factor of the dark representation is not increased so much. As mentioned above, if the liquid crystal layer has a twist angle of 0, the extraordinary ray has an absorption coefficient of 0.3 μm$^{-1}$, while the ordinary ray has an absorption coefficient of 0.03 μm$^{-1}$. Hence, the difference therebetween is so great. By reducing the difference, even on both ends of the visible wavelength where the retardation of the phase plate is shifted out of the ideal condition, the reflection factor of the dark representation is not increased so much, which may lead to reducing the coloring of the dark representation.

Further, by reducing the retardation of the phase plate, it is possible to reduce the thickness of the phase plate accordingly. Hence, by diminishing a voltage value to be applied to the phase plate, the driving voltage may be reduced as well. The retardation of the phase plate is determined on the retardation required for converting the extraordinary ray in incidence into the ordinary ray after reflection. As described with respect to the prior art, if the liquid crystal layer has a twist angle of 0, the retardation is a quarter wave. Therefore, by reducing the phase difference between the extraordinary ray in incidence and the ordinary ray after reflection, it is possible to make the retardation of the phase plate smaller than the quarter wave.

In order to realize those, according to the present invention, at first, the liquid crystal layer utilizes a twist alignment. More general definitions of the extraordinary ray and the ordinary ray are as follows, in which definitions both twist alignments and the liquid crystal layer having a twist angle of 0 are included. Of two optical eigen modes propagating through the liquid crystal layer, if the major axis of an ellipse depicted by the orbit of the electric vector is in parallel to the alignment direction of the liquid crystal, it is the extraordinary ray, while if the major axis thereof is perpendicular to the alignment direction of the liquid crystal, it is the ordinary ray.

The pitch p of the twist alignment of the liquid crystal layer is sufficiently longer than the wavelength $\lambda$ of the transmitted light, the p dependency of $\alpha_e$ and $\alpha_o$ are represented by the following expression (4):

$$\alpha_{e,o} = (n_e \alpha_e \beta_{e,o}^2 + n_o \alpha_o)/n_e \beta_{e,o}^2 + n_o) \quad (4)$$

$$\beta_{e,o} = |E_{x1,2}/E_{y1,2}| \quad (5)$$

FIG. 6 shows the change of $\alpha_e$ and $\alpha_o$ appearing in changing the helical pitch p plotted by using the expression (4). As shown, by reducing the helical pitch p, it is possible to reduce $\alpha_e$.

Likewise, $\alpha_o$ may be increased. As mentioned above, according to the present invention, by utilizing the twist alignment for the liquid crystal layer for reducing the difference between $\alpha_e$ and $\alpha_o$, the reduction of the coloring of the dark representation may be realized.

According to the present invention, secondly, the phase difference of the phase plate is determined to be a half of a phase difference between the ordinary ray in incidence and the extraordinary ray in reflection. If the liquid crystal layer utilizes the twist alignment, the optical eigen mode is an elliptically polarized light as shown in FIG. 7 and the optical eigen mode in incidence in an optical path is different from the optical eigen mode after reflection in an optical path. For example, consider that the incident direction and the reflecting direction of light are in parallel to the twist axis of the liquid crystal layer. In this case, the extraordinary ray 43 in incidence is an elliptically polarized light turned clockwise and the ordinary ray 44 in incidence is an elliptically polarized light turned counterclockwise. The ellipticity and the direction of the major axis of the extraordinary ray 45 and the ordinary ray 46 in reflection are the same as those of the extraordinary ray 43 and the ordinary ray 44 in reflection. However, the rotation direction thereof in incidence is reverse to that in reflection. The extraordinary ray in reflection is an elliptically polarized light turned counterclockwise. The ordinary ray in reflection is an elliptically polarized light turned clockwise.

Since the optical eigen mode in incidence in an optical path is different from the optical eigen mode after reflection in an optical path, the phase difference between the ordinary ray in incidence and the extraordinary ray in reflection may be made smaller than a half wavelength. According to the present invention, by using the relation between the alignment of the liquid crystal layer and the optical eigen mode, the thickness of the phase plate is reduced and the increase of the driving voltage is suppressed.

As described above, according to the present invention, by utilizing the twist alignment for the liquid crystal layer and setting the retardation of the phase plate according to the polarized state of the optical eigen mode, the two problems involved by the retardation film type guest host liquid crystal display, that is, the coloring of the dark representation and the increase of the driving voltage may be reduced at a time.

DESCRIPTION OF THE EMBODIMENTS

The content of the present invention will be concretely described along the embodiments.

First Embodiment

Figure 1:
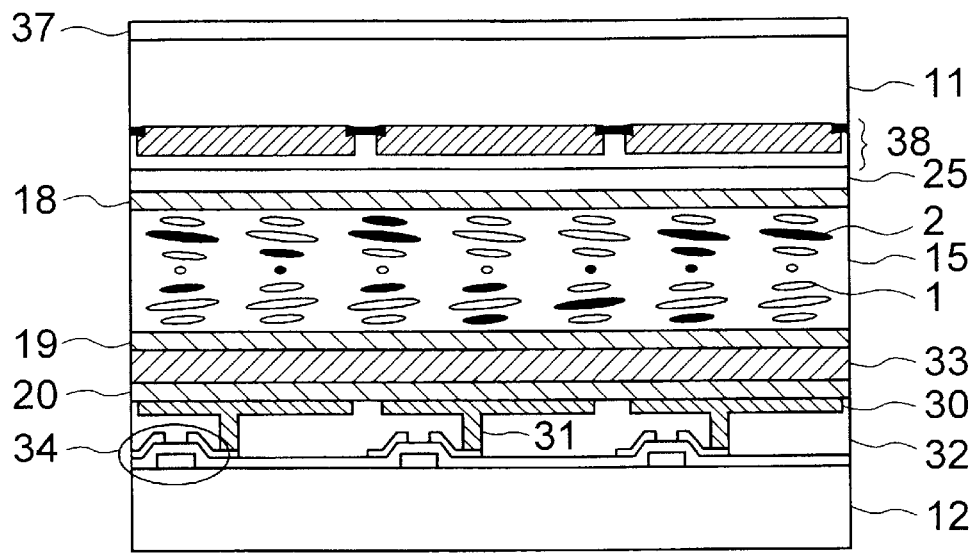
FIG. 1 is a sectional view showing a composition of a liquid crystal display according to a first embodiment of the present invention.
Figure 2:
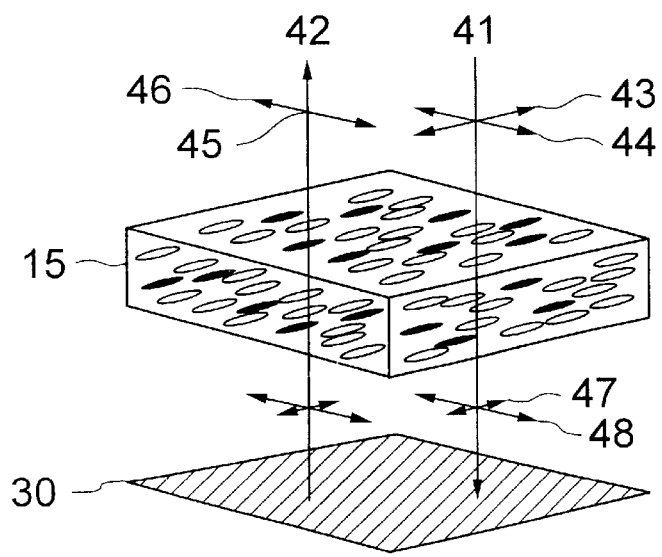
FIG. 2 is a view showing an absorption of an optical eigen mode in the absence of a phase plate.
Figure 3:
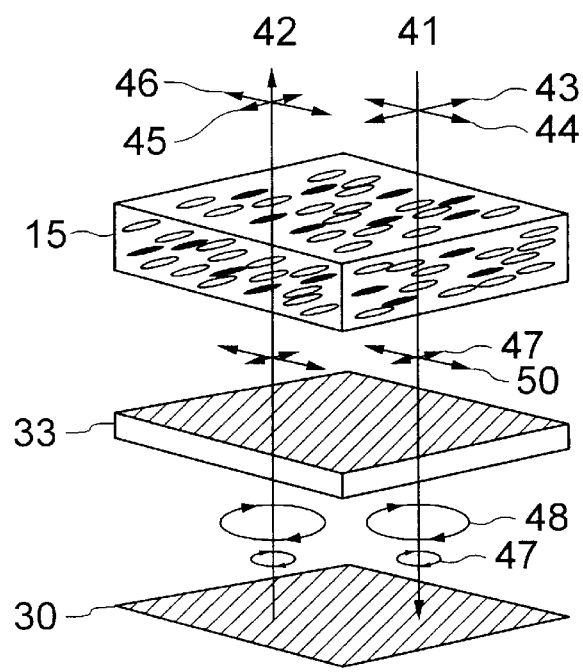
FIG. 3 is a view showing an absorption of an optical eigen mode in the case of providing a phase plate.
Figure 4:
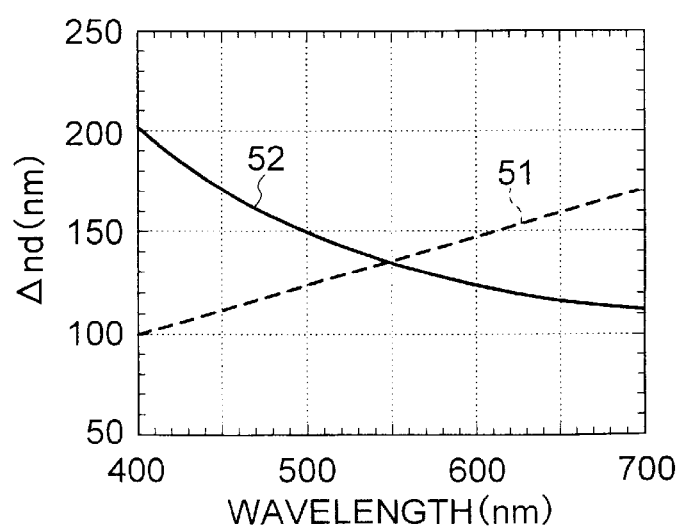
FIG. 4 is a graph showing a wavelength dispersion of a retardation of an ideal phase plate and a wavelength dispersion of a retardation of a real phase plate.
Figure 5:
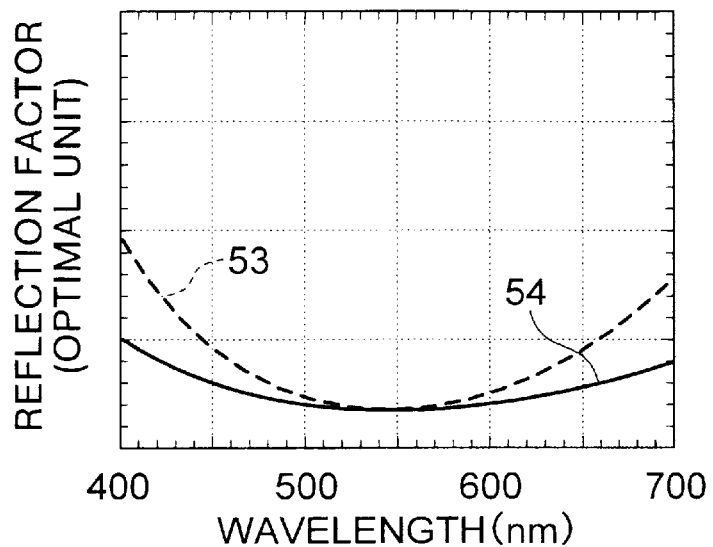
FIG. 5 is a graph showing a reflection spectrum of dark representation in the case of a twist angle of 0 and a reflection spectrum thereof in the case of a twist alignment.
Figure 6:
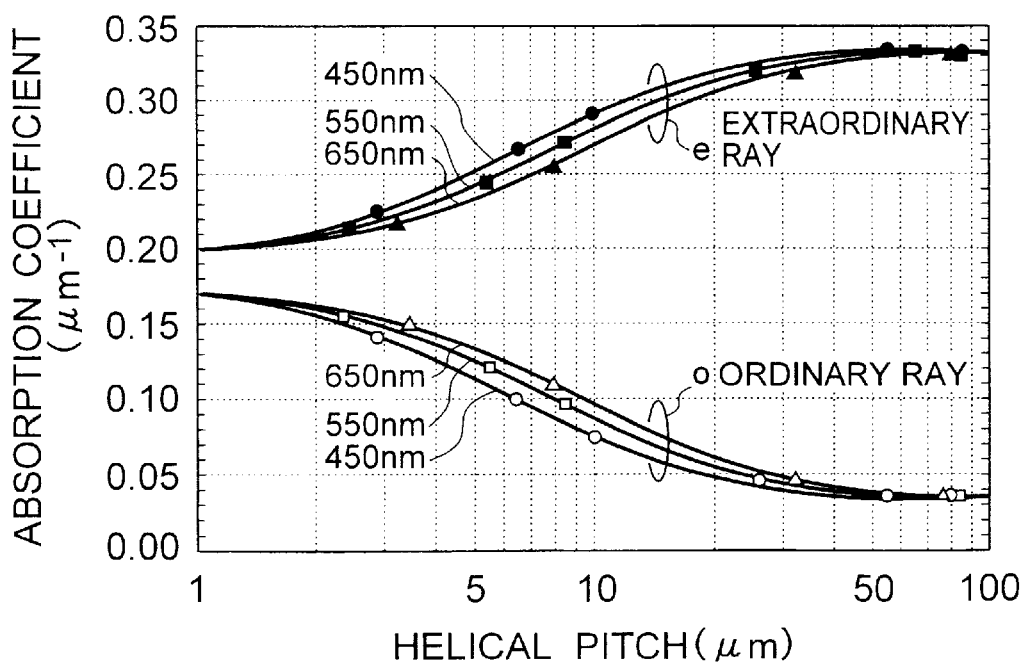
FIG. 6 is a graph showing dependency of a helical pitch on an absorption coefficient of an optical eigen mode.
Figure 7:
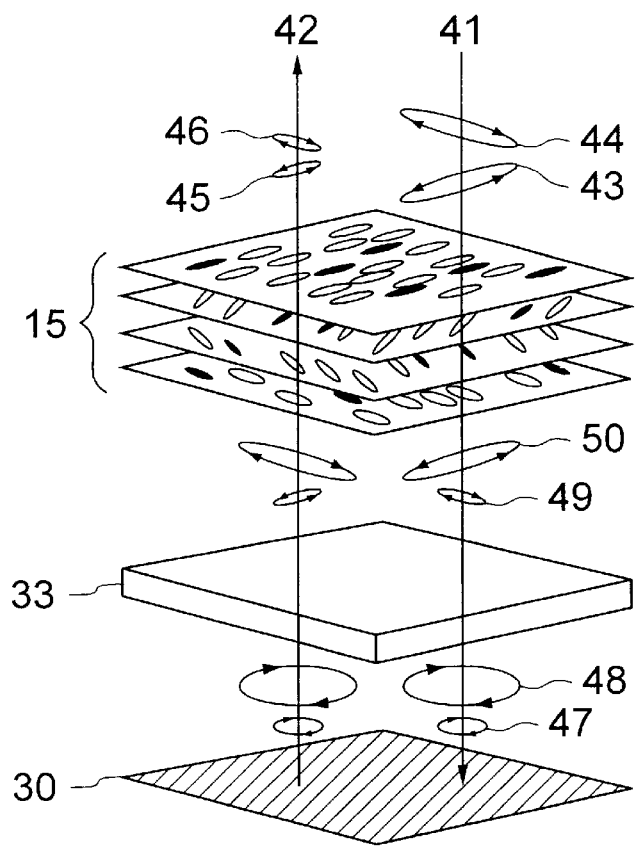
FIG. 7 is a view showing an absorption of an optical eigen mode in the case that the liquid crystal layer has a twist alignment.
Figure 8:
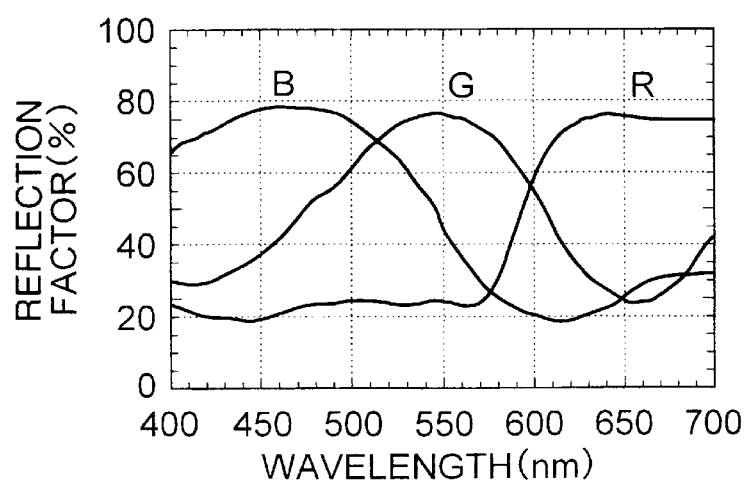
FIG. 8 is a graph showing dependency of a wavelength on a transmission factor of a color filter.
Figure 9A:
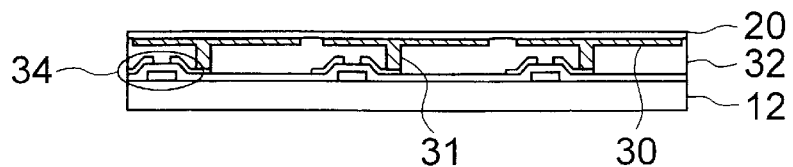
FIGS. 9A to 9F are sectional views showing a process of forming a phase plate.
Figure 9B:
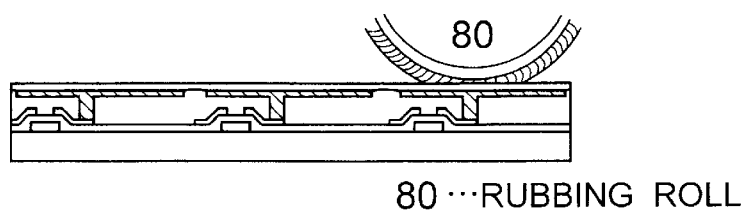
Figure 9C:
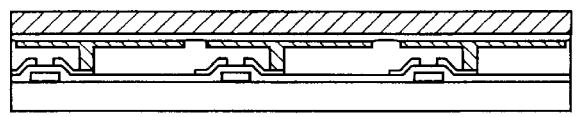
Figure 9D:
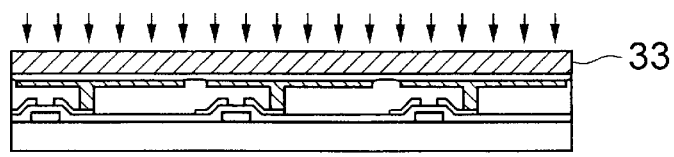
Figure 9E:
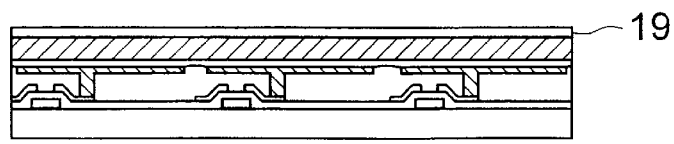
Figure 9F:
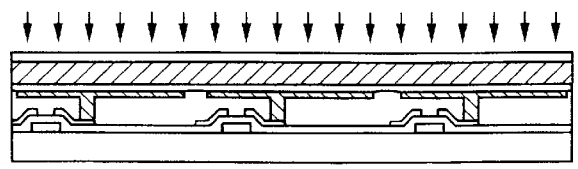

FIG. 1 is a sectional view showing a liquid crystal display according to the present invention. A pair of substrates are provided, a first one 11 of which is made of borosilicate glass and has a thickness of 0.7 mm. On the first substrate is laminated a common electrode 25 and a color filter 38 in this sequence. The common electrode is made of chromium and has a thickness of 1000 Å. The color filter is produced by the pigment dispersion method. The color filter has a transmittance spectrum as shown in FIG. 8. The maximums of the transmittance for R, G and B are located at the wavelengths of 620 nm, 540 nm and 480 nm, respectively.

The other substrate, that is, the second substrate 12 is made of the same material as the first substrate and has the same thickness. The second substrate 12 has reflective electrodes 30 and first active elements 34. The reflective electrodes are made of Al and has a thickness of 2000 Å. The first active element is an anti-staga thin film transistor. Each of the reflective electrodes corresponds to one pixel and is formed to be roughly rectangular. The size thereof is about 100 μm×300 μm. The reflective electrode is connected with the first active element through a through hole 31 so that both are insulated from each other by an insulating layer 32 made of SiNx.

A phase plate is formed on the reflective electrode formed on the second substrate. The process of forming the phase plate is shown in FIGS. 9A to 9F. At first, a third alignment layer 20 is formed by means of the spin coat method (see FIG. 9A). Then, the alignment treatment is executed on the third alignment layer 20 by means of a rubbing roll 80 (see FIG. 9B). Next, photo polymeric liquid crystal molecules are formed on the third alignment layer (see FIG. 9C). The photo polymeric liquid crystal molecular layer is so thin that the third alignment layer serves to apply the anchoring force on the overall layer. Hence, the layer is subject to the homogeneous alignment in parallel to the direction regulated by the third alignment layer. Then, a ray of light is applied to the layer for polymerizing the liquid crystal molecules. The polymerized molecules are made to be the phase plate 33 (see FIG. 9D). Next, a second alignment layer 19 is formed thereon by the spin coat method (see FIG. 9E). Since the second alignment layer has a photo aligning characteristic, the alignment treatment may be executed on the second alignment layer by applying a ray of light onto the layer (see FIG. 9F). The alignment directions of the first and the second alignment layers form an angle of 45 degrees.

The first alignment layer 18 and the third alignment layer are made of polyimide manufactured by Nissan Kagaku (Nissan Chemical Industries) Ltd.

Figure 10:
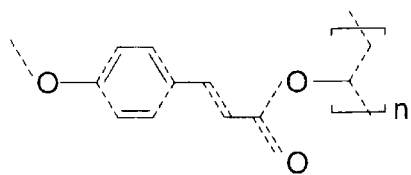
FIG. 10 is a view showing a molecular structure of a photoreactive high polymeric organic molecule used in a second alignment layer.

Like the first alignment layer and the third alignment layer, the second alignment layer may be made of polyimide polymer. Herein, however, the second alignment layer is made of polyvinyl ester having 4-methoxy cinnamate as a side chain. The molecular structure is shown in FIG. 10. In FIG. 10, typically, n ranges from 20 to 10000. On this organic alignment layer, the photodimarization is caused on the material of 4-methoxy cinnamate used as a side chain by applying a ray of light. By using a linearly polarized light for a ray to be applied, it is possible to select a combination of two 4-methoxy cinnamates causing photoreaction according to the vibrating direction of the electric vector. Hence, the direction of the chemical bond caused by the photoreaction can be controlled. It is experimentally known that the liquid crystal molecules are aligned perpendicularly to the vibrating direction of the linearly polarized light. This makes it possible to control the alignment direction of the liquid crystal by means of the vibrating direction of the light (linearly polarized light).

A light source used for doing the alignment treatment uses a high pressure mercury lamp that irradiates a line spectrum around a wavelength of 360 nm. The natural light applied from the light source is made to be a linearly polarized light by passing the natural light through a Gran-Thompson prism. The irradiation light power is 5 J/cm$^2$ and the irradiation time is 2 minutes.

The aforementioned photo alignment layer and the photo alignment technique are described in detail in Japanese Patent Publication No. 2608661 or the literature (Martin Schadt, Hubert Seiberle, Andreas Schuster et al., NATURE, Vol.381, May 16, 1996). Other than the photo alignment layer shown in FIG. 10, for example, a material of chalcone polymers may be used. The 4-methoxy cinnamate or the chalcone polymers may be used for a photo polymeric alignment layer. Instead, the photo alignment layer formed by using potodissiciation or the photo alignment layer formed by using photoisomeization may be used as well.

Figure 11:
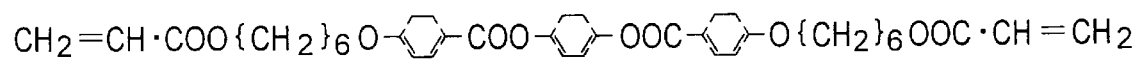
FIG. 11 is a view showing a molecular structure of a photoreactive liquid crystal molecule used in a phase plate.

The photo polymeric liquid crystal molecules used herein are described in the literature of Dirk J. Broer, Rifat A. M. Hikment, Ger Challa et al., Makromol. Chem. Vol. 190, 3201–3215 (1989). The molecular structure shown in FIG. 11 is composed so that the photo polymeric liquid crystal molecule has acrylic groups on both sides. The molecules may be polymerized by the acrylic groups. Further, the molecule has a mesogen portion and a bar-like structure on its center. This structure makes it possible to keep those molecules in the liquid crystal state. Since a double refraction after polymerization depends on the polymerizing condition, the double refraction takes about 0.15 to 0.16.

In order to form the phase plate, at first, the photo polymeric liquid crystal molecules solved in a solvent are coated on the first alignment layer by means of the spin coat method. Then, the solvent is removed therefrom. Next, the first alignment layer is heated up to 160° C. so that the photo polymeric liquid crystal molecules are temporarily made to be an isotropic layer. Then, the temperature of the layer is lowered down to 140° C. so that the photo polymeric liquid crystal molecules are made to be a liquid crystal layer. The liquid crystal layer is aligned in the aligning direction of the first alignment layer. Next, the liquid crystal layer is polymerized by applying a ray of light so that the polymerized layer is made to be the phase plate as keeping the alignment in the same direction as the alignment of the first alignment layer. Like the photo alignment layer, the light source used for this purpose uses a high pressure mercury lamp that irradiates a line spectrum around a wavelength of 360 nm. The irradiation light power is 5 J/cm$^2$. The irradiation time is five minutes.

The third alignment layer 14 formed on the first substrate is made of polyimide polymer manufactured by the Nissan Kagaku (Nissan Chemical Industry), Ltd. The third alignment layer 14 is aligned by the rubbing method so that the third alignment layer 14 and the second photo alignment layer coated on the second substrate form an angle of 200 degrees when building the liquid crystal display.

Next, these two substrates are built so that both of the alignment layers are opposed to each other. For keeping the distance between the two substrates even and the thickness of the liquid crystal layer even on the overall surface of the display, a spacer and a sealing portion are formed therebetween. The spacer is composed of spheric polymer beads each of which has a diameter of 7 μm. Those polymer beads are dispersed on the overall surface of the display. The dispersion density is about 100 per 1 cm². The sealing portion is formed by pasting a mixture of spheric polymer beads with epoxy resin on the peripheral portion of the display.

The liquid crystal layer is composed of a mixture of host liquid crystal compound ZLI14932 manufactured by Merck, Ltd. and a chiral dopant S811 manufactured by the Merck Company and dichroic dye composed of anthraquinone deriver Tives and diamine deriver Tives. The weight density of S811 is about 0.9%. The liquid crystal layer is formed by sealing the mixture in vacuum. The material of ZLI4392 has a positive dielectric constant anisotropy. It substantially shows an achromatic color.

The foregoing alignment directions of the first and the second substrates and the addition of a given amount of chiral dopant to the liquid crystal layer result in twisting the liquid crystal layer with a twist angle of 200 degrees. By setting the twist angle to 200 degrees and the thickness of the liquid crystal layer at about 7 μm, the helical pitch is set at about 12 μm.

Figure 12:
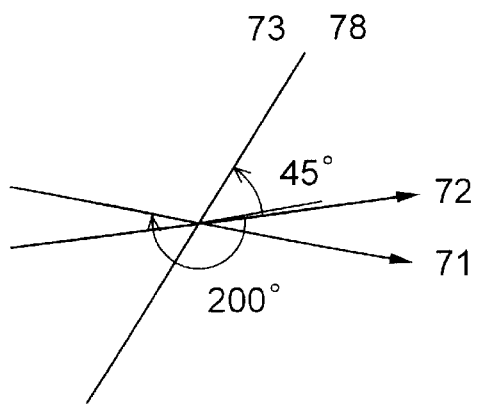
FIG. 12 is a view showing relation between a slow axis direction of a phase plate and a liquid crystal alignment direction of the LCD device according to the first embodiment of the present invention.

The structure of S811 has an S-configuration. Hence, when the alignment direction of the liquid crystal layer is observed from the axial direction of the twist, the alignment direction is changed clockwise from the second substrate located farther to the first substrate. Hence, as shown in FIG. 12, the slow axis of the phase plate and the closer alignment direction of the liquid crystal layer form an angle of 45 degrees counterclockwise.

Figure 13:
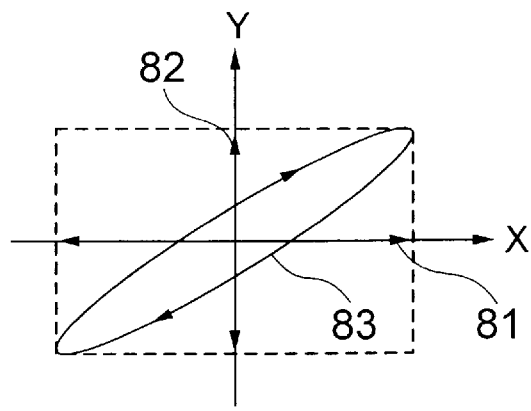
FIG. 13 is a view showing definition of a Stokes parameter.

The optimal value of the retardation of the phase plate is determined as follows. In order to quantitatively determine the retardation of the phase plate when the liquid crystal layer has a twist alignment, herein, the Stokes parameters ($S_1$, $S_2$, $S_3$) and the Poincare sphere representation are used. At first, the definitions of the Stokes parameters and the Poincare sphere representation will be described. As shown in FIG. 13, the Stokes parameters ($S_1$, $S_2$, $S_3$) are defined by the following expression with an X-axis component 81 $E_x$, a Y-axis component 82 $E_y$, and a phase difference δ therebetween.

$$S_1 = (E_x^2 - E_y^2)/(E_x^2 + E_y^2) \quad (6)$$

$$S_2 = 2E_x E_y \cos\delta/(E_x^2 + E_y^2) \quad (7)$$

$$S_3 = 2E_x E_y \sin\delta/(E_x^2 + E_y^2) \quad (8)$$

wherein the X axis denotes an alignment direction of the liquid crystal layer on the plane coming closer to the phase plate and the Y axis denotes a perpendicular direction to the alignment direction.

Figure 14:
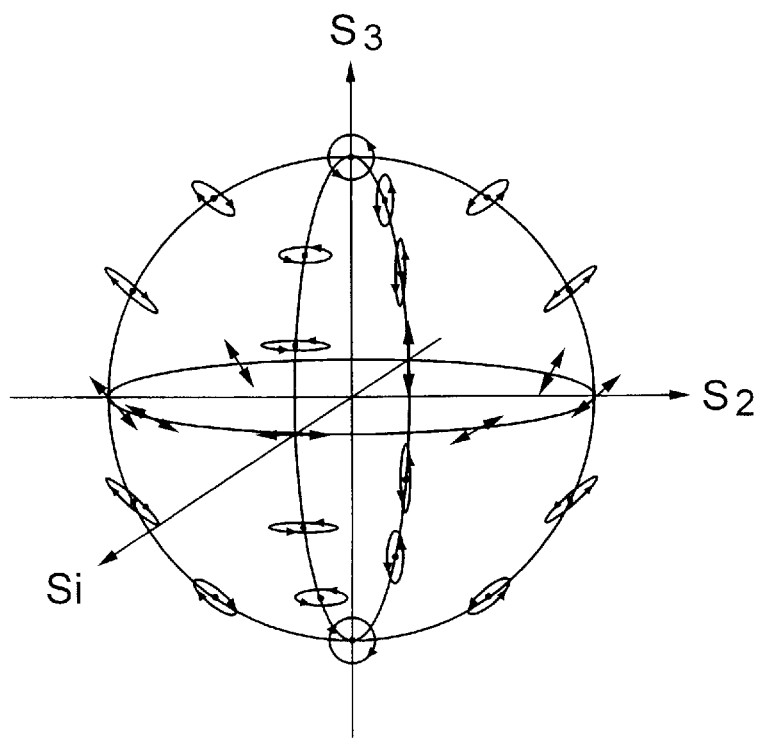
FIG. 14 is a view showing correspondence between a Poincare sphere representation and a polarized state.

The Poincare sphere is a sphere with a radius 1 defined within a space with ($S_1$, $S_2$, $S_3$) as three axes as shown in FIG. 14. Each point on the surface of the Poincare sphere corresponds to the polarized state in a one-to-one manner. For example, a crossline (equator) with the ($S_1$, $S_2$) corresponds to a linearly polarized light. Two crosspoints (pole) with the $S_3$ axis corresponds to a circularly polarized light. The other portion corresponds to an elliptically polarized light. An azimuth around the $S_3$ axis corresponds to twice as large an angle as an azimuth of a major axis (direction of vibration of a linearly polarized light) of the elliptically polarized light.

Figure 15:
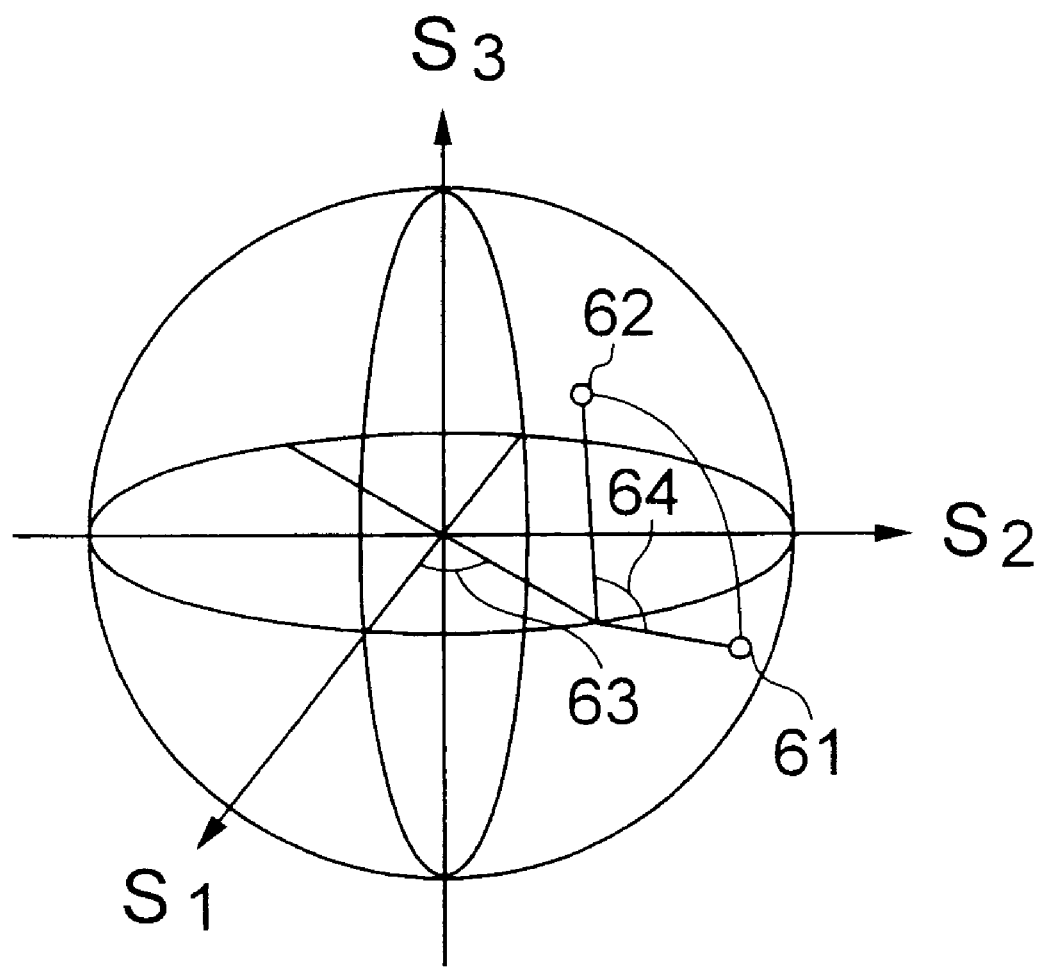
FIG. 15 is a view showing conversion of a polarized state through the phase plate on the Poincare sphere representation.

The conversion of the polarized state through the phase plate is contained on the ($S_1$, $S_2$) plane on the Poincare sphere representation as shown in FIG. 15 and is represented by the rotation with a straight line passing through the center of the Poincare sphere as an axis. In FIG. 15, 61 denotes a polarized state before incidence into the phase plate and 62 denotes a polarized state after transmission through the phase plate. At this time, the azimuth 63 of the axis is twice as large as that of the slow axis of the phase plate.

The angle of rotation 64 is in proportion to the retardation of the phase plate. For example, if the retardation is a quarter wave of the transmitted light (the phase plate is a quarter wave plate), the angle of rotation is 90 degrees.

Figure 16:
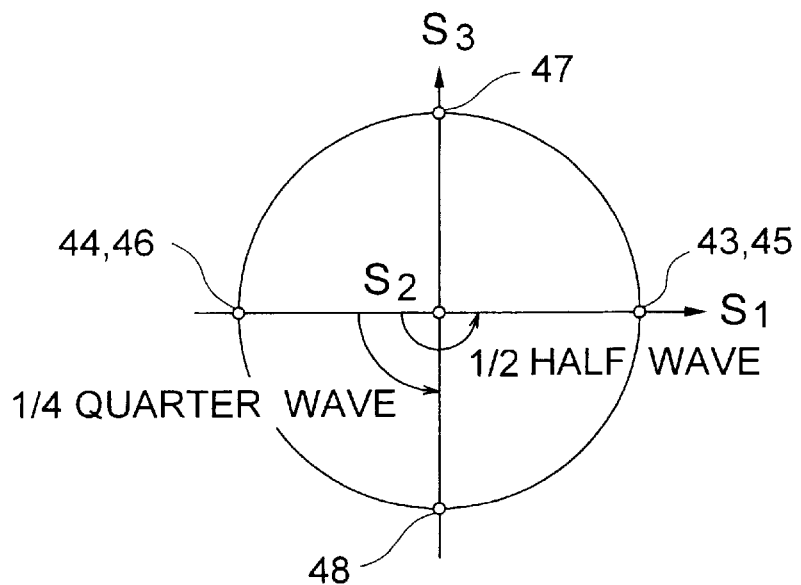
FIG. 16 is a view showing conversion of a polarized state through the phase plate in the case of providing the twist angle with 0 degree, on the Poincare sphere representation.
Figure 17:
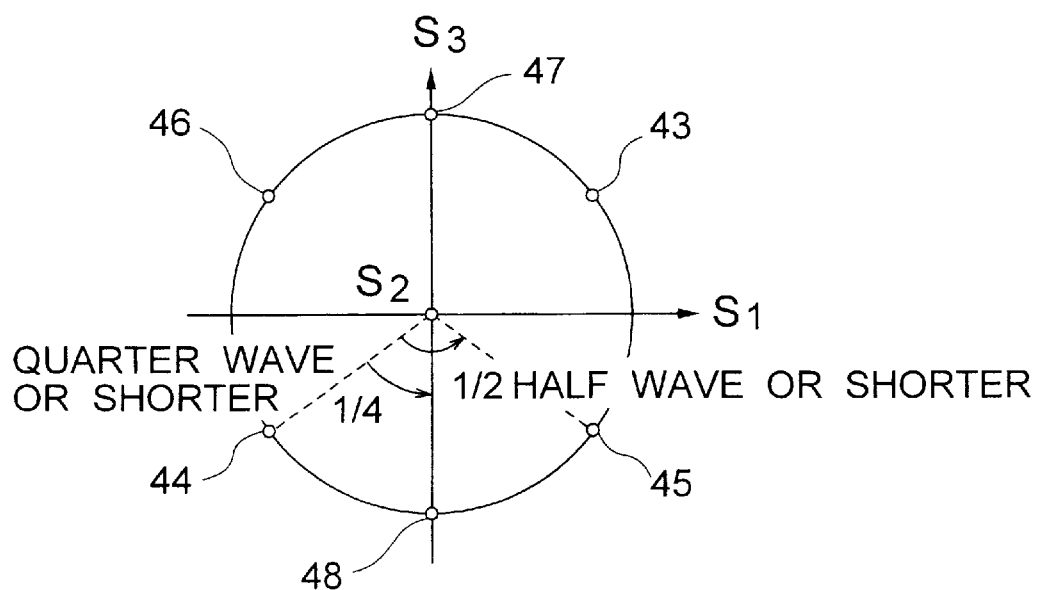
FIG. 17 a view showing conversion of a polarized state through the phase plate in the case of providing the liquid crystal layer with the twist alignment, on the Poincare sphere representation.

On the Poincare sphere defined as above, the optical eigen mode in incidence in an optical path, the optical eigen mode after reflection in the optical path, and the conversion of the optical eigen mode through the effect of the phase plate are considered. FIGS. 16 and 17 show the Poincare spheres projected on the ($S_1$, $S_3$) plane. The positive direction of the $S_1$ axis corresponds to the liquid crystal alignment direction on the closer plane to the phase plate, while the negative direction corresponds to the perpendicular direction thereto. Hence, the optical eigen mode on the closer plane to the phase plate is located on the circumference in FIGS. 16 and 17. Since the slow axis of the phase plate and the liquid crystal alignment direction on the closer plane form an angle of 45 degrees, the axis of rotation for representing the conversion of the polarized state through the phase plate passes through the center of the circle in FIGS. 16 and 17 and is perpendicular to the paper. Hence, the conversion of the optical eigen mode caused with the passage of the phase plate is represented by the rotation around the center of the circle, that is, the movement on the circumference in FIGS. 16 and 17.

For comparison, the case that the twist angle is 0 is shown in FIG. 16. In this case, the optical eigen mode is composed of two linearly polarized lights, which are the same linearly polarized lights in incidence and after reflection. In order to convert the ordinary ray 44 in incidence into the extraordinary ray 45 after reflection, it is necessary to move half on the circumference. Hence, the retardation required for the phase plate corresponds to a quarter of the circumference, that is, a quarter wave.

FIG. 17 shows the case that the liquid crystal layer has the twist alignment, that is, the twist angle has any angle except zero. In this case, the optical eigen mode has two elliptically polarized lights. These two lights have the substantially same ellipticity, the major axes perpendicular to each other, and the directions of rotation reverse to each other. They are located on the opposite sides with a center of a circle laid therebetween. The optical eigen mode after reflection merely changes the direction of rotation without changing the ellipticity and the azimuth of the major axis. Hence, the optical eigen mode after reflection is symmetrical to the optical eigen mode in incidence with the $S_3$ axis laid therebetween. Hence, the rotation required for converting the ordinary ray 44 in incidence into the extraordinary ray 45 after reflection corresponds to a half or less of the circumference. It means that the retardation required for the phase plate is smaller than a quarter wave.

When the ray of light passes through the phase plate once and then enters into the reflection plate, the polarized state immediately before the entrance into the reflection plate is a circularly polarized light. Hence, the retardation required for the phase plate corresponds to the angle of rotation required for converting the ordinary ray in incidence into the circularly polarized light. By producing an inner product of the Stokes parameters of the ordinary ray in incidence and the Stockes parameters (0, 0, ±1) for representing the circularly polarized light, the angle of rotation may be derived from the inner product. Representing the Stokes parameters of the ordinary ray in incidence with $E_{x1,2}$ and $E_{y1,2}$, since the phase difference between $E_{x1,2}$ and $E_{y1,2}$ is $\pi/2$, those parameters may be represented as follows.

$$S_1 = (E_{x1,2}^2 - E_{y1,2}^2)/(E_{x1,2}^2 + E_{y1,2}^2) \quad (9)$$

$$S_2 = 0 \quad (10)$$

$$S_3 = 2E_{x1,2}E_{y1,2}/(E_{x1,2}^2 + E_{y1,2}^2) \quad (11)$$

Figure 18:
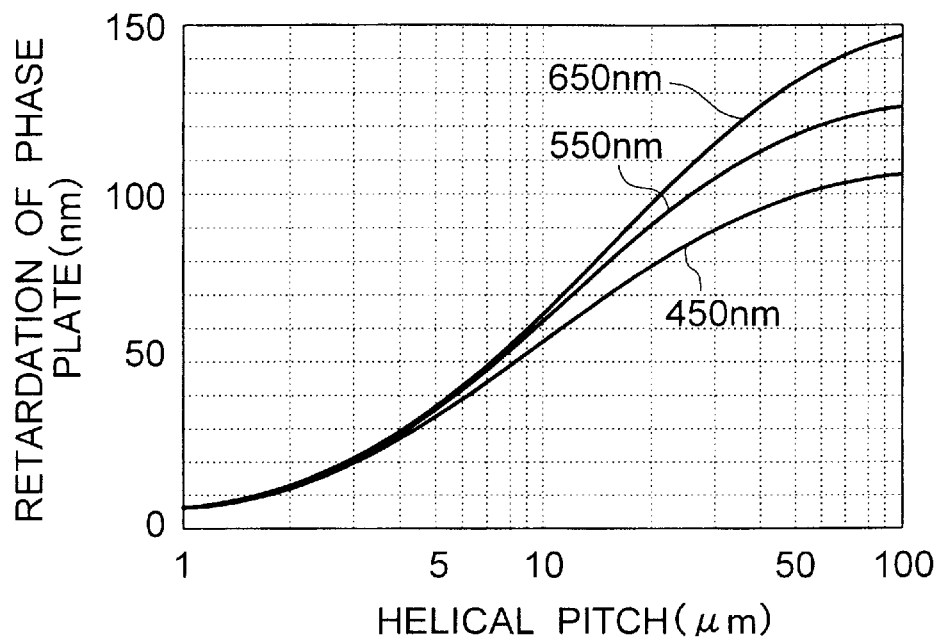
FIG. 18 is a graph showing dependency of a retardation of the phase plate on the helical pitch.

By producing an inner product of (9) to (11) and (0, 0, ±1), deriving an angle of rotation from the inner product, and converting the angle of rotation into the retardation, the expression (1) may be derived. The result derived by substituting a solid-state value of LA121-4 in the expression (1) and changing the retardation against the pitch of the twist alignment is shown in FIG. 18. As stated above, since the helical pitch is set to about 11 μm, the retardation of the phase plate is determined as 70 nm as is viewed in FIG. 18.

A light-diffusive film 37 is pasted on the surface of the panel. The light-diffusive film contains lots of particles each of which has the corresponding index of refraction. The film serves to scatter light by utilizing the difference of index of refraction between the mother material of the film and the particles. Therefore, if the light enters at an angle of incidence shifted out of the proper reflecting condition as viewed from the user, the film serves to guide the light into the direction of observation so that the amount of light to be observed by the user may be increased. Further, in some cases, though the user and the landscape may be reflected on the display, by making the contour obscure, the appearance may be reduced. Further, the driving device is connected to the panel. The resulting composition is made to be the liquid crystal display.

The display characteristics of the retardation film type guest host liquid crystal display according to the present invention created as above was measured by the method to be described below. The light source uses a metal halide lamp. The ray of light is irradiated at an angle of about 10 degrees against a vertical of the panel and is reflected at an angle of about 15 degrees against the vertical of the panel. This reflected light was measured by a luminance meter. Since the measurement is done at an angle that does not meet the positive reflecting condition, the measurement is not influenced by the reflected light on the surface of the panel. The luminance of the plate of magnesium oxide measured in the same condition was set as a reflection factor 100%.

Figure 19:
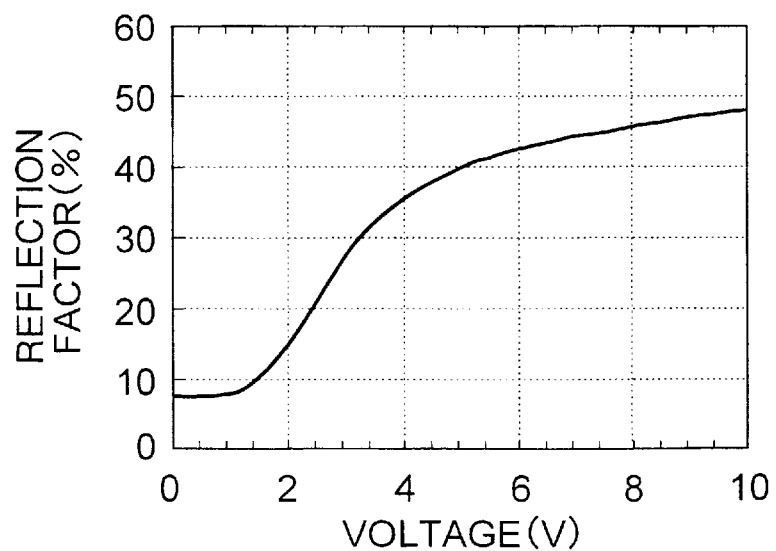
FIG. 19 is a graph showing dependency of an applied voltage on a reflection factor of the liquid crystal display according to the first embodiment of the present invention.
Figure 20:
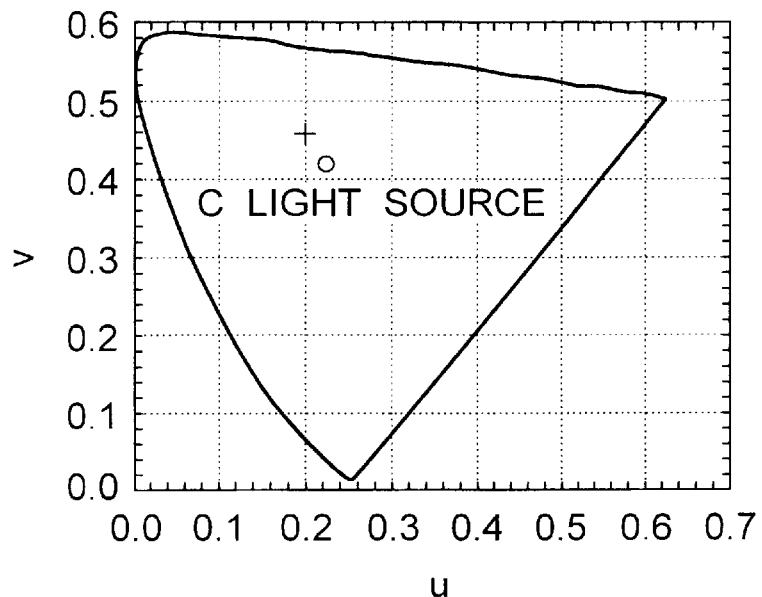
FIG. 20 is a graph showing a chromaticity of dark representation of the liquid crystal display according to the first embodiment of the present invention.

The dependency of the reflection factor on the applied voltage is shown in FIG. 19. This is a normally close type dependency on the applied voltage, in which the reflection factor at the applied voltage of 8 V is 46,6%, the reflection factor at the applied voltage of 0 V is 7.3%, and the contrast ratio is 6.4:1. The measured result of a hue in the dark representation (applied voltage 0 V) is shown by a circle in FIG. 20. The hue is (u, v)=(0.221, 0.418) in the CIE uniform color space and indicates a substantially achromatic color.

As described above, by keeping the liquid crystal layer twistedly aligned, setting the retardation of the phase plate according to the helical pitch, and setting the angle formed between the slow axis of the phase plate and the closer liquid crystal alignment direction thereto according to the twisting direction, it is possible to produce the liquid crystal display having an achromatic color and a high contrast ratio.

Second Embodiment

Figure 21:
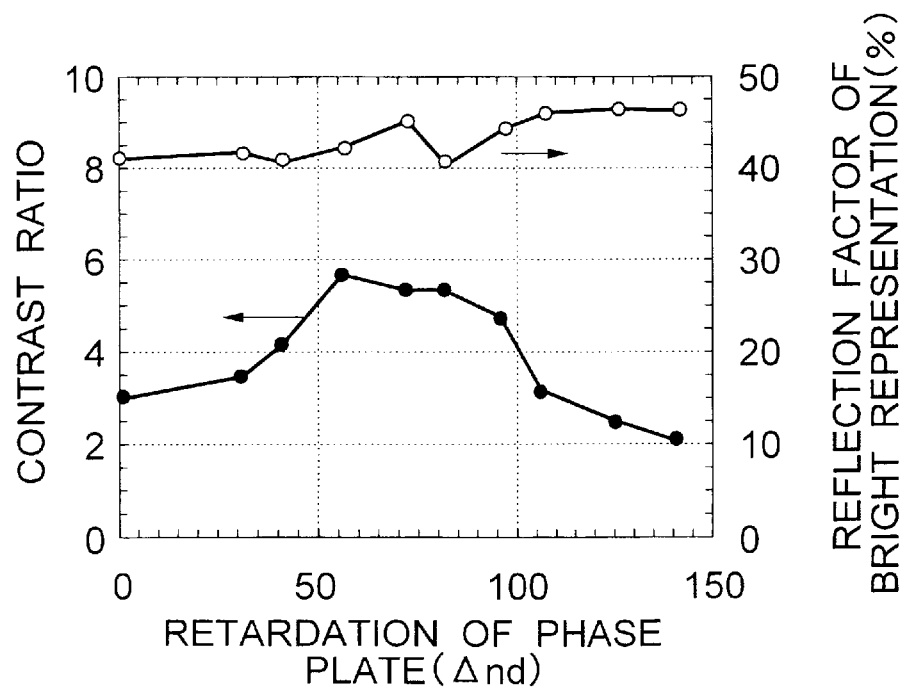
FIG. 21 is a graph showing dependency of a retardation of the phase plate on a contrast ratio of a liquid crystal display according to the second embodiment of the present invention.

In the liquid crystal displays of the first embodiment, the retardation of the phase plate is changed into 9 values, that is, 140 nm, 125 nm, 105 nm, 95 nm, 80 nm, 55 nm, 40 nm, 30 nm and 0 nm (no phase plate). The measured result of the contrast ratio and the reflection factor in bright representation at each value is shown in FIG. 21.

Mr. or Ms. Kubota at the Seikei University revealed a preferable display characteristics to the reflective color liquid crystal display on the basis of the sensitive test. If the reflection factor reaches 35 to 40% or larger and the contrast ratio is 5 or larger, the tester estimates that the display having such characteristics reaches an allowable level. (The Journal of The Institute of Television Engineers of Japan, Vol.50, No.8, pages 1091 to 1095 (1996)) The retardation of the phase plate for meeting this condition is 35 nm or larger but 90 nm or smaller as is grasped from FIG. 21.

The reflection factor of the bright representation is mainly determined on the addition of dye. It is hardly influenced by the retardation of the phase plate. Hence, the reflection factor of the bright representation is substantially kept 40% or more if the retardation of the phase plate ranges from 45 nm to 90 nm. If the retardation of the phase plate ranges from 45 nm to 90 nm, the reflection factor reaches the satisfactory level reveled by the foregoing sensitive test, which leads to an excellent representation.

Third Embodiment

In the liquid crystal displays of the first embodiment, the thickness of the liquid crystal layer is about 5 μm and the twist angle of the liquid crystal layer is 240 degrees. The content of dye in the liquid crystal material is about 1.2 time as great as that of the first embodiment. In this case, the helical pitch of the twist alignment of the liquid crystal is about 7.5 μm. It is grasped from the expression (1) that the optimal retardation of the phase plate is about 48 nm.

Figure 22:
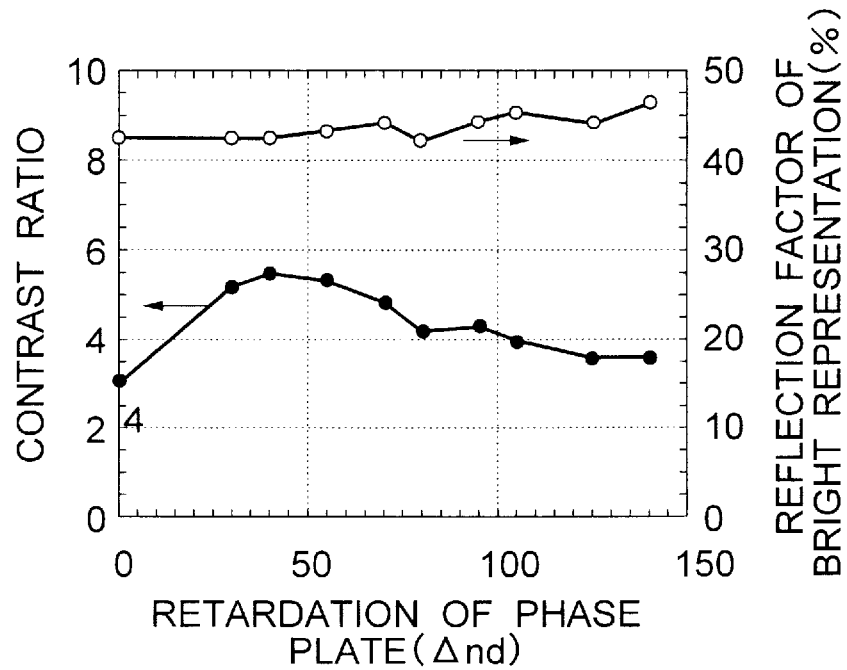
FIG. 22 is a graph showing dependency of a retardation of the phase plate on a contrast ratio of a liquid crystal display according to a third embodiment of the present invention.

Further, several liquid crystal displays were produced in which they have respective retardations of the phase plates, concretely, 140 nm, 125 nm, 105 nm, 95 nm, 80 nm, 70 nm, 55 nm, 40 nm, 30 nm, and 0 nm (no phase plate). The measured result of each contrast ratio and the reflection factor of the bright representation are shown in FIG. 22. It is understood from the graph of FIG. 22 that the proper retardation of the phase plate, that is, the retardation for meeting the condition of the reflection factor of 35 to 40% or more and the contrast ratio of 5 or more, ranges from 25 nm to 65 nm. The reflection factor was substantially kept 40% or more in this range. Hence, the excellent representation can be obtained if the retardation of the phase plate ranges from 25 nm to 65 nm.

Fourth Embodiment

In the liquid crystal displays of the first embodiment, the twist angle of the liquid crystal layer is set at 180 degrees. In this case, the pitch of the twist alignment of the liquid crystal layer is 14 μm. It is revealed from the expression (1) that the optimal retardation of the phase plate is about 75 nm.

Figure 23:
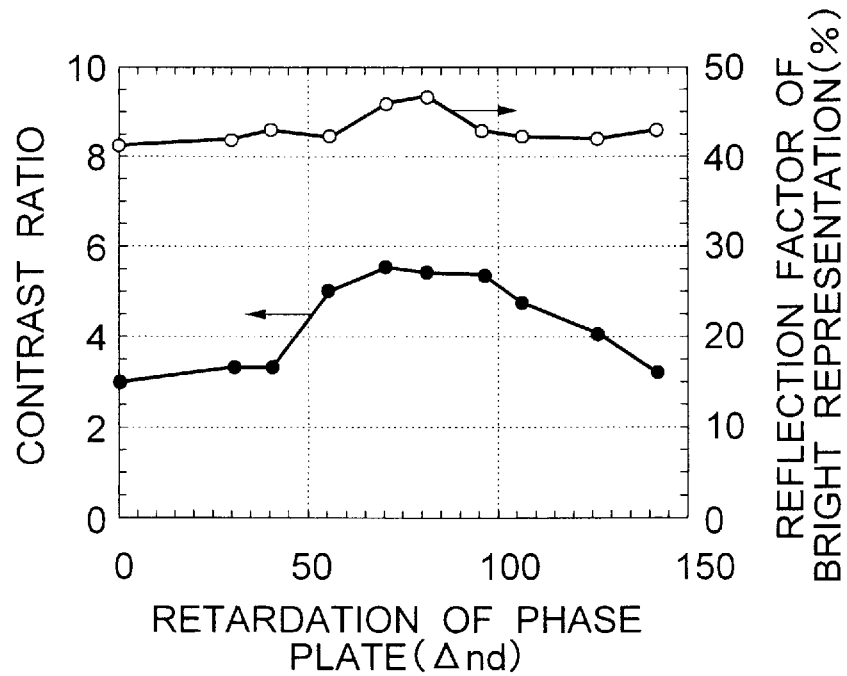
FIG. 23 is a graph showing dependency of a retardation of the phase plate on a contrast ratio of a liquid crystal display according to a fourth embodiment of the present invention.

Moreover, ten liquid crystal displays were produced in which they have their respective retardations of the phase plates, concretely, 140 nm, 125 nm, 105 nm, 95 nm, 80 nm, 70 nm, 55 nm, 40 nm, 30 nm, and 0 nm (no phase plate). The measured results of each contrast ratio and reflection factor of bright representation are shown in FIG. 23. It may grasped from the graph of FIG. 23 that the proper retardation of the phase plate, concretely, the retardation for meeting the reflection of 35 to 50% or more and the contrast ratio of 5 or more, ranges from 55 nm to 100 nm. The reflection is substantially kept 40% or more in this range. Hence, the excellent representation can be obtained if the retardation of the phase plate ranges from 55 nm to 110 nm.

Fifth Embodiment

In the liquid crystal displays of the first embodiment, the twist angle of the liquid crystal layer is set at 140 degrees. The helical pitch of the twist alignment of the liquid crystal layer is 9 μm. It is revealed from the expression (1) that the optimal retardation of the phase plate is about 90 nm.

Figure 24:
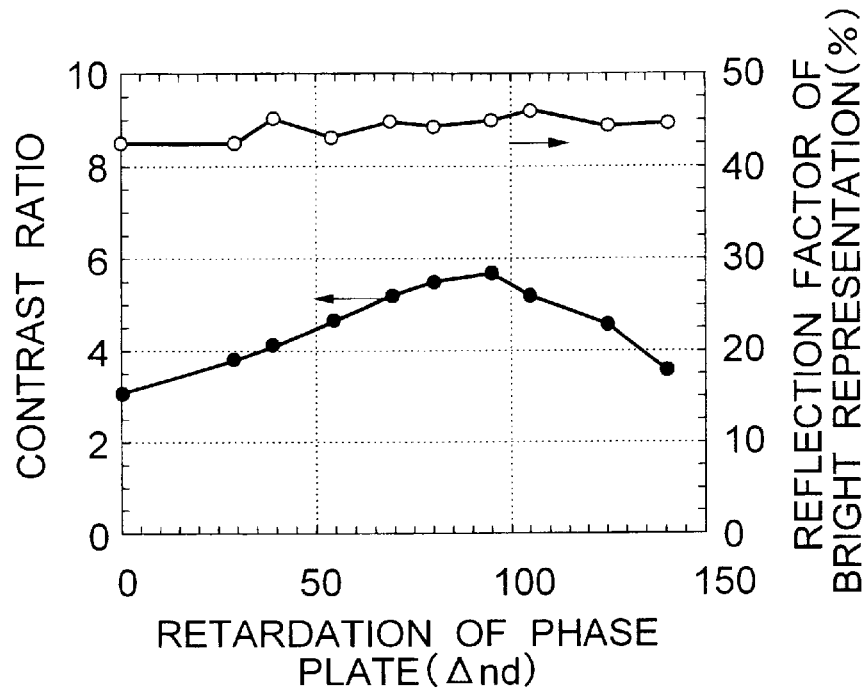
FIG. 24 is a graph showing dependency of a retardation of the phase plate on a contrast ratio of a liquid crystal display according to a fifth embodiment of the present invention.
Figure 25:
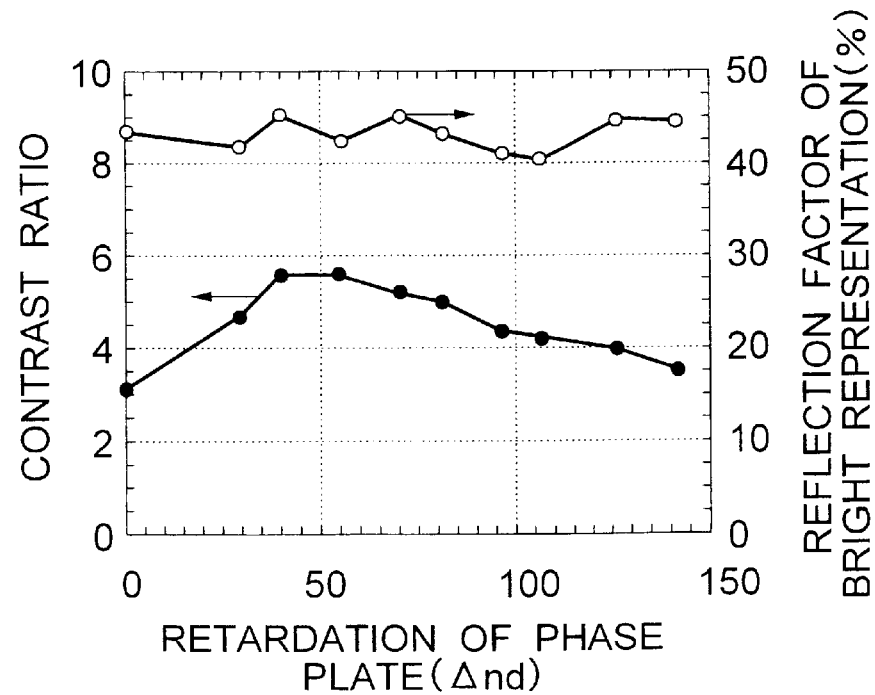
FIG. 25 is a graph showing dependency of a retardation of the phase plate on a contrast ratio of a liquid crystal display according to a sixth embodiment of the present invention.

Further, ten liquid crystal displays were produced in which they have their respective retardations of the phase plates, concretely, 140 nm, 125 nm, 105 nm, 95 nm, 80 nm, 70 nm, 55 nm, 40 nm, 30 nm, and 0 nm (no phase plate). The measured results of each contrast ratio and each reflection factor of the bright representation are shown in FIG. 24. The measured results of each contrast ratio and each reflection factor of the bright representation are shown in FIG. 25. It is grasped from the graph of FIG. 24 that the proper retardation of the phase plate, concretely, the retardation for meeting the condition of the reflection factor of 35 to 40% or more and the contrast ratio of 5 or more, ranges from 60 nm to 110 nm. The reflection factor is substantially kept 40% or more in this range. Hence, the excellent display characteristics can be obtained if the retardation of the phase plate ranges from 60 nm to 110 nm.

Sixth Embodiment

In the liquid crystal displays of the third embodiment, the twist angle of the liquid crystal layer is set at 200 degrees. The helical pitch of the twist alignment of the liquid crystal layer is 9 μm. It is revealed from the expression (1) that the optimal retardation of the phase plate is about 55 nm.

Further, ten liquid crystal displays were produced in which they have their respective retardations of the phase plates, concretely, 140 nm, 125 nm, 105 nm, 95 nm, 80 nm, 70 nm, 55 nm, 40 nm, 30 nm, and 0 nm (no phase plate). The measured results of each contrast ratio and reflection factor of the bright representation are shown in FIG. 25. It is grasped from the graph of FIG. 25 that the proper retardation of the phase plate, concretely, the retardation for meeting the condition of the reflection factor of 35 to 40% or more and the contrast ratio of 5 or more, ranges from 35 nm to 80 nm. The reflection factor is substantially kept 40% or more in this range. Hence, the excellent display characteristics can be obtained if the retardation of the phase plate ranges from 35 nm to 80 nm.

Seventh Embodiment

Figure 32:
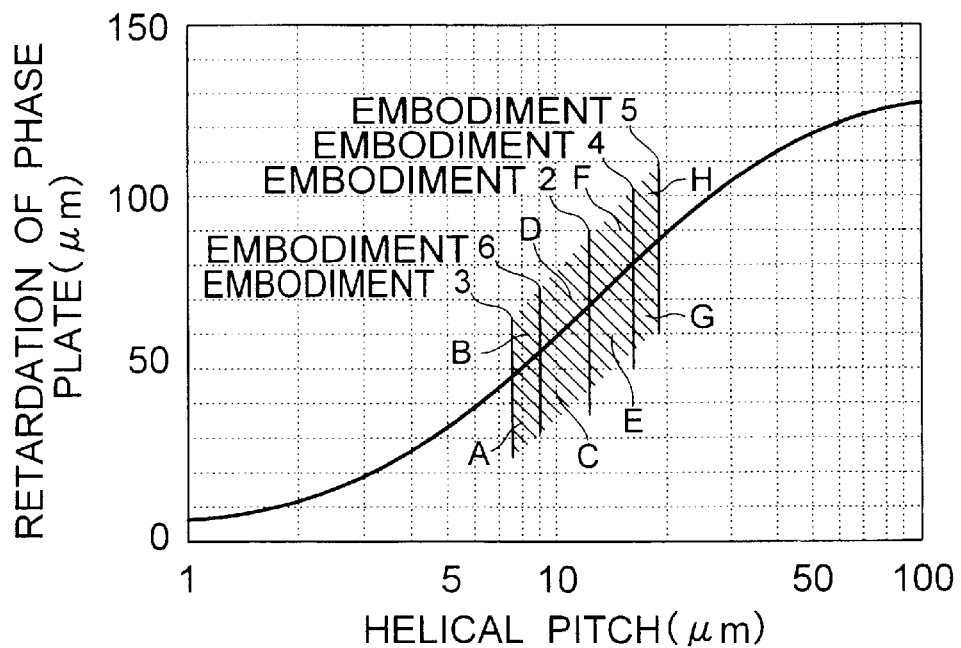
FIG. 32 is a graph showing a range of a helical pitch and a retardation of a phase plate for providing an excellent display and a helical pitch and a retardation of a phase plate of a liquid crystal display considered in the seventh embodiment.

In the second to the sixth embodiments, the liquid crystal displays were produced in which the helical pitch of the twist alignment of the liquid crystal layer is constant but the retardations of the phase plates are respective. The display characteristics of these displays were measured. In the second to the sixth embodiments, the range where the reflection factor ranges from 35 to 40% or more and the contrast ratio is 5 or more (referred to as an effective range) is shown by a thick line in FIG. 32. In FIG. 32, the optimal retardations of the phase plates against the transmitted light with a wavelength of 550 nm derived from the expression (1) (like the plot noted as 550 nm in FIG. 18) were described in FIG. 32.

The effective range of each embodiment is expanded with the optimal value of the retardation as its center. By connecting the upper limits of the effective ranges of the embodiments, the connected line is likewise to the plot of the optimal retardations. By connecting the lower limits thereof, the resulting line is not even. However, it is considered that this unevenness results from an error in the test. By ignoring the unevenness, the connected line is also likewise to the plot of the optimal retardations.

From the above description, it is estimated that the effective range spreads over the range with the optimal retardation as its center in each helical pitch. Assuming that the set of the effective ranges in any helical pitch is called an effective area. The effective area is estimated as a portion enclosed by the following (12) to (15) in FIG. 32.

$$P=7.5 \tag{12}$$

$$P=18 \tag{13}$$

$$\Delta=51.4 In(P)-38.6 \tag{14}$$

$$\Delta=40.0 In(P)-55.6 \tag{15}$$

wherein P denotes a helical pitch, Δ denotes an optimal retardation of the phase plate, and In denotes a logarithm with a natural logarithm as a base number. The expression (12) corresponds to the effective area of the third embodiment and the expression (13) corresponds to the effective area of the fifth embodiment. The expression (14) corresponds to a line connecting the lower end of the effective area of the third embodiment with the lower end of he effective area of the fifth embodiment. The expression (15) corresponds to a line connecting the upper end of the effective area of the third embodiment with the upper end of the effective area of the fifth embodiment. The portion enclosed by the expressions (12) to (15) is indicated by oblique lines in FIG. 32.

In order to check if the area indicated by the expressions (12) to (15) is an effective area, the liquid crystal displays for the points A to H within this area were produced and the display characteristics of those displays were measured. The helical pitches and the retardations of the phase plate at the points A to H are listed in Table 1. The points A to H are listed in FIG. 32. The points A to H are evenly distributed in the area indicated by the expressions (12) to (15).

TABLE 1

| Point in FIG. 32 | Pitch of Twist Alignment (μm) | Reflection Factor (%) | Contrast Ratio |
| --- | --- | --- | --- |
| A | 40 | 32 | 5.5:1 |
| B | 60 | 34 | 5.3:1 |
| C | 45 | 35 | 6.1:1 |
| D | 70 | 35 | 6.2:1 |
| E | 60 | 36 | 6.6:1 |
| F | 90 | 37 | 6.5:1 |
| G | 65 | 35 | 6.2:1 |
| H | 100 | 36 | 6.5:1 |

The reflection factors and the contrast ratios of the liquid crystal displays for the points A to H are listed in Table 1. At any of the points A to H, the reflection factor is 35 to 40% and the contrast ratio is 5 or more. This indicates that the area enclosed by the expressions (12) to (15) is an effective area. By adjusting the helical pitch of the liquid crystal layer and the retardation of the phase plate to be in the area indicated by the expressions (12) to (15), it is possible to produce the reflective color liquid crystal displays with an excellent display characteristic.

Eighth Embodiment

Figure 26:
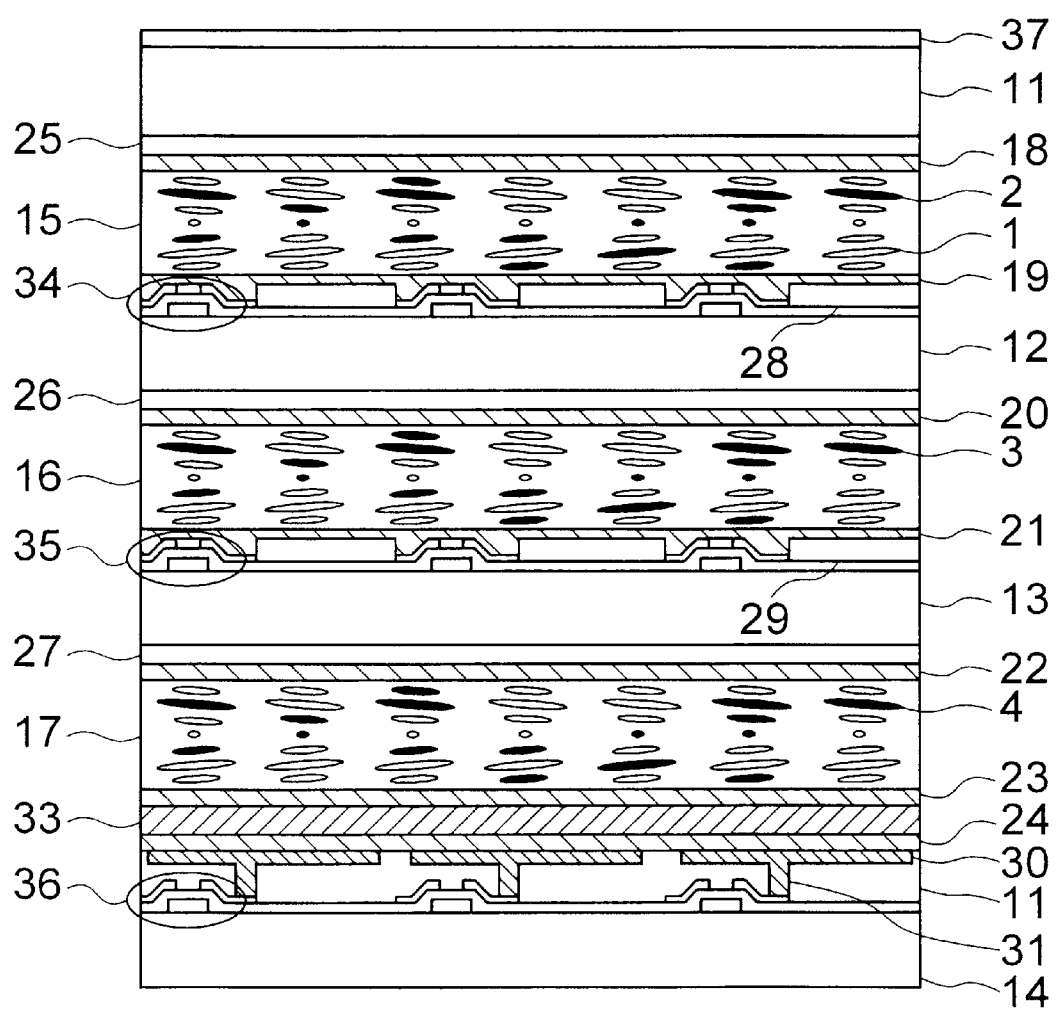
FIG. 26 is a sectional view showing a composition of a liquid crystal display according to an eighth embodiment of the present invention.

FIG. 26 is a sectional view showing a liquid crystal display according to the present invention. A numeral 11 denotes a substrate made of borosilicate glass and having a thickness of 0.7 mm. The first substrate 11 includes a first common electrode 25 on a closer side to a first liquid crystal layer 15. The first common electrode is made of ITO (Indium Tin Oxide) and has a thickness of 1000 Å.

A numeral 12 denotes a second substrate made of borosilicate glass and having a thickness of 0.4 mm. The second substrate 12 includes a first transparent electrode 28 and first active elements 34 on a closer side to the first liquid crystal layer. The first transparent electrode is made of ITO and has a thickness of 2000 Å. Each of the first active elements is composed of an anti-staga type thin film transistor. The second substrate 12 includes a second common electrode 26 on a closer side to the second liquid crystal layer. The second common electrode is made of ITO and has a thickness of 2000 Å. The second substrate 12 includes a second alignment layer 19 on a closer surface to the first liquid crystal layer and a third alignment layer 20 on a closer surface to the second liquid crystal layer. The second and the third alignment layers are both made of polyimide polymer.

A numeral 13 denotes a third substrate made of borosilicate glass and having a thickness of 0.4 mm. The third substrate 13 includes a second transparent electrode 29 and second active elements 35 on a closer side to the third liquid crystal layer. The transparent electrode is made of ITO and has a thickness of 2000 Å. Each of the second active elements is composed of an anti-stag type thin film transistor. The third substrate 13 includes a third common electrode 27 on a closer side to the third liquid crystal layer. The third common electrode is made of ITO and has a thickness of 2000 Å. The third substrate 13 includes a fourth alignment layer 21 on a closer surface to the second liquid crystal layer and a fifth alignment layer 22 on a closer to the third liquid crystal layer. The fourth and the fifth alignment layers are made of polyimide polymer.

The fourth substrate 14 is made of borosilicate glass and has a thickness of 0.7 mm. The third substrate 14 includes a reflective electrode 30 and third active elements 36 on a closer side to the third liquid crystal layer. The reflective electrode is made of Al and has a thickness of 2000 Å. Each of the third active elements is composed of an anti-staga type thin film transistor. The reflective electrode and the third active element are connected through a through hole 31 and are insulated from each other by an insulating layer 32 made of SiNx.

The first transparent electrode, the second transparent electrode, and the reflective electrode are piled as viewed from a vertical of the substrate. The combination of these piled electrodes forms one pixel. The form of one pixel is substantially square. The size of the first or the second transparent electrode is about 300 μm×300 μm and the size of the reflective electrode is about 250 μm×250 μm.

A numeral 33 denotes a phase plate formed on the reflective electrode of the fourth substrate. The method for forming the phase plate 33 is likewise to the method for forming the phase plate included in the liquid crystal display according to the first embodiment. The alignment direction of the phase plate is regulated by the seventh alignment layer made of polyimide polymer. The fourth substrate includes a sixth alignment layer on a closer surface to the liquid crystal layer 3. The material, the forming method, and the alignment treatment of the sixth alignment layer are analogous to those of the second alignment layer of the liquid crystal layer according to the first embodiment.

Next, those four substrates are composed so that the first and the second transparent electrodes and the reflective electrode are piled as viewed from the vertical of the substrate. In order to make the distance between the adjacent substrates uniform and the thickness of the liquid crystal layer uniform on the overall surface of the display, a spacer and a sealing portion are formed between the adjacent substrates. The spacer is composed of spherical polymer beads, each of which has a diameter of 6 μm and which are dispersed on the overall display. A dispersion density is about 100 per 1 cm². The sealing portion is made of a mixture of spherical polymer beads with epoxy resin and is pasted on the peripheral portion of the display. Each sealing portion provides a port through which the liquid crystal is injected and sealed. In order to avoid the mixture of the liquid crystal materials, the sealing portions are located so that the overlap of the ports thereof as viewed from the vertical of the substrate may be avoided.

Figure 27:
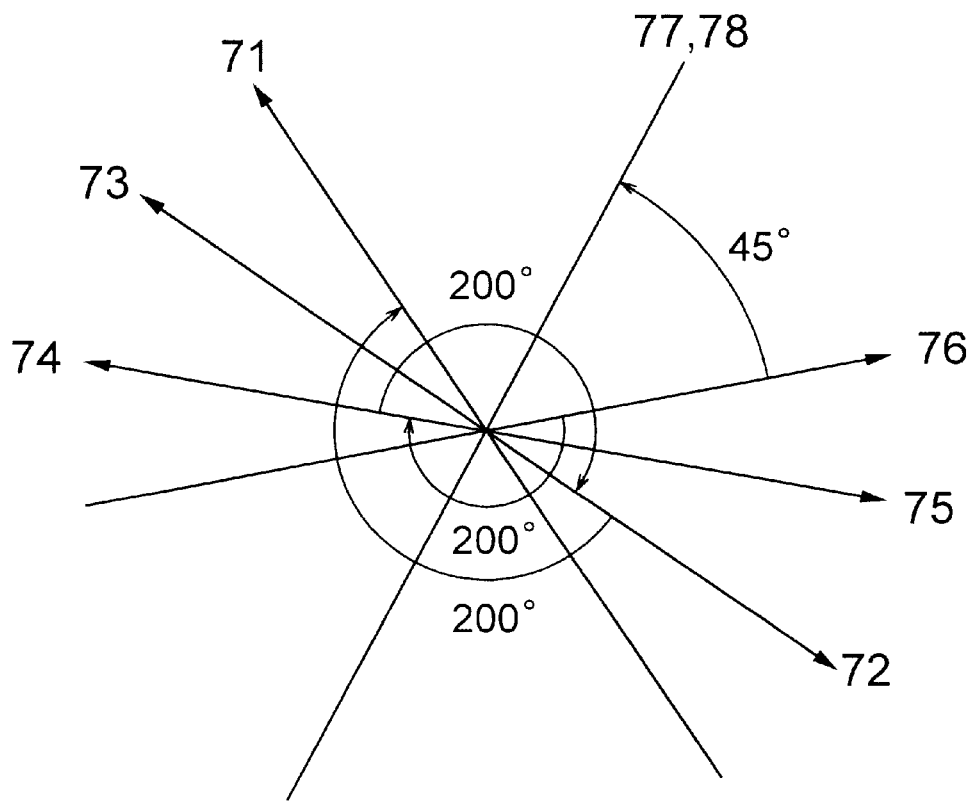
FIG. 27 is a view showing relation between a slow axis direction of a phase plate and an alignment direction of liquid crystal of the liquid crystal display according to the eighth embodiment of the present invention.

The alignment treatment direction of each alignment layer as viewed from the vertical of the substrate is illustrated in FIG. 27. The alignment direction 72 of the second alignment layer is parallel to the alignment direction 73 of the third alignment layer, so that the alignment directions of the first and the second liquid crystal layers are made parallel to each other on their closer surfaces to each other. Further, the alignment direction 74 of the fourth alignment layer is parallel to the alignment direction 75 of the fifth alignment layer, so that the alignment directions of the second and the third liquid crystal layers are made parallel to each other on their closer surfaces to each other.

Since the structure of S811 is formed as an S body and the alignment direction of each alignment layer is set as shown in FIG. 27, when viewing the alignment direction of the liquid crystal layer from the axial direction of the pitch, the alignment direction is changed clockwise from the second substrate to the first substrate. Likewise, the alignment direction is changed clockwise from the third to the second substrate and from the fourth to the third substrate. Hence, the slow axis 78 of the phase plate forms an angle of 45 degrees with the closer alignment direction 76 of the liquid crystal layer as shown in FIG. 27.

The first liquid crystal layer is made of a mixture of the liquid crystal material MLZ-4792 manufactured by the Merck company, the chiral dopant S811 manufactured by the Merck company, and the dichroic dye presenting a color of cyan. The weight ratio of S811 is about 0.9%. The dichroic dye indicates a maximum of light transmittance in the wave range of 450 nm to 550 nm. The liquid crystal mixture used for the second liquid crystal layer is the same as that used for the first liquid crystal layer except the dichroic dye. The dichroic dye indicates a maximum of light transmittance in the wave range of 550 nm to 650 nm. The liquid crystal mixture used for the third liquid crystal layer is the same as that used for the first liquid crystal layer except the dichroic dye. The dichroic dye indicates two maximums of light transmittance in two wave areas, one maximum for the wave range of 400 nm to 500 nm and the other maximum for the wave range of 600 nm to 700 nm. The liquid crystal mixture is injected and sealed in vacuum from each sealing port for forming the liquid crystal layer.

The alignment directions of the first and the second substrates and the addition of a given amount of the chiral dopant to the liquid crystal layer results in making the liquid crystal layer twisted. By setting the twist angle at 200 degrees and the thickness of the liquid crystal layer at about 6 μm, the helical pitch is made to be about 11 μm.

A light-diffusing film 23 is pasted on the surface of the first substrate for increasing the brightness as well as reducing the reflection of an ambient scene. The connection of the driving device to that results in producing the liquid crystal display for providing color display through the subtractive mixture of color stimuli.

The display characteristics of the retardation film type guest host liquid crystal displays according to the invention as produced as described above were measured by the same method as that of the first embodiment. The reflection factor given by applying a voltage of 8 V to each liquid crystal layer is 69.1%. The reflection factor at an applied voltage of 0 V is 11.0%. The contrast ratio is 6.3:1. The hue in the dark representation is (u, v)=(0.222, 0.413) in the CIS calorimetric system, that is, substantially achromatic.

As described above, by setting the retardation of the phase plate according to the helical pitch and an angle formed by the slow axis of the phase plate and the closer liquid crystal alignment thereto according to the twisting direction and making the closer alignment directions of the liquid crystal of three liquid crystal layers parallel to one another, an achromatic display with a high contrast ratio can be obtained also in the liquid crystal displays composed of a lamination of three liquid crystal layers for presenting three colors of cyan, yellow, and magenta and for presenting the color through the subtractive mixture of color stimuli First Cited Reference In the liquid crystal displays of the first embodiment, the twist angle of the liquid crystal layer is set at zero. Further, the retardation of the phase plate is set at a quarter wave at a wavelength of 550 nm.

The first cited reference provides the normally close type dependency on an applied voltage as shown in FIG. 27, in which the reflection factor at the applied voltage of 8 V is 45.5%, the reflection factor at the applied voltage 0 V is 7.0%, and the contrast ratio is 6.5:1. The hue in the dark representation (applied voltage of 0 V) is (u, v)=(0.305, 0.353) in the CIE uniform color space as shown by a circle in FIG. 30 and colored in purple.

As mentioned above, assuming that the twist angle of the liquid crystal layer is zero, since the difference of an absorption coefficient between two optical eigen modes is so large, light leakage at both ends of the visible wavelength is increased, so that the dark representation is colored in purple.

Second Cited Reference

In the liquid crystal displays of the first embodiment, the retardation of the phase plate is set at a quarter wave at the wavelength of 550 nm.

Figure 30:
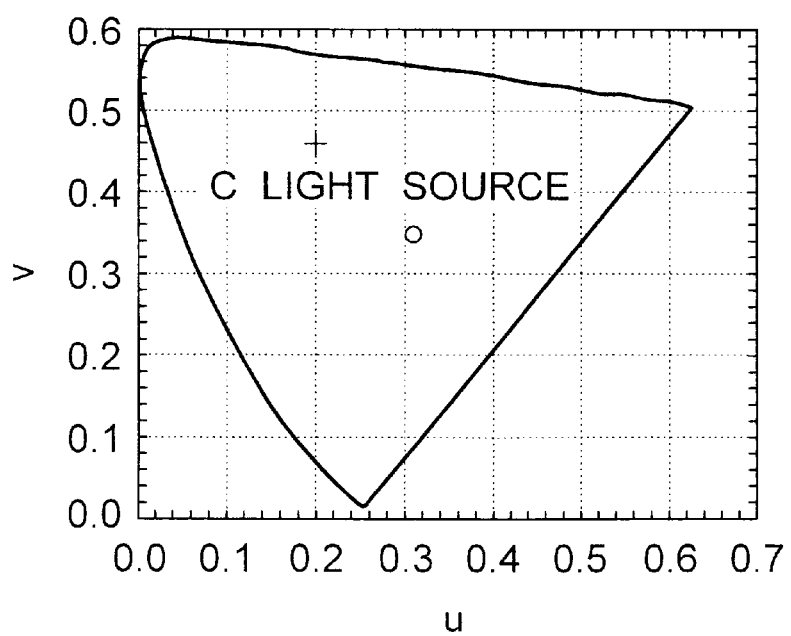
FIG. 30 is a graph showing dependency of an applied voltage on a reflection factor of a liquid crystal display according to a second cited reference.

The second cited reference provides normally closed type dependency on an applied voltage as shown in FIG. 30, in which the reflection factor at the applied voltage of 8 V is 33.0%, the reflection factor at the applied voltage of 0 V is 12.9%, and the contrast ratio is 2.8:1.

The retardation of the phase plate is required to be set at a half of a phase difference between the ordinary ray in incidence and the extraordinary ray after reflection. In case the liquid crystal layer has a twist alignment, the phase difference is smaller than a half wave, so that the retardation of the phase plate is required to be a quarter wave.

Since the retardation of the phase plate is set at a quarter wave though the liquid crystal layer has an twist alignment, the ordinary ray in incidence is not converted into the extraordinary after reflection. Hence, the reflection factor of the dark representation is not sufficiently reduced, so that the contrast ratio is made lower.

Third Cited Reference

In the liquid crystal displays of the first embodiment, the phase plate is removed.

In measuring the dependency of a reflection factor on an applied voltage, the third cited reference provides the normally close type dependency on the applied voltage, in which the reflection factor at the applied voltage of 8 V is 45.9%, the reflection factor at the applied voltage of 0 V is 14.8%, and the contrast ratio is 3.1:1.

Since the phase plate is removed, the ordinary ray in incidence is not converted into the extraordinary ray after reflection. As a result, the reflection factor of the dark representation is not sufficiently reduced, so that the contrast ratio is made lower.

Fourth Cited Reference

Figure 28:
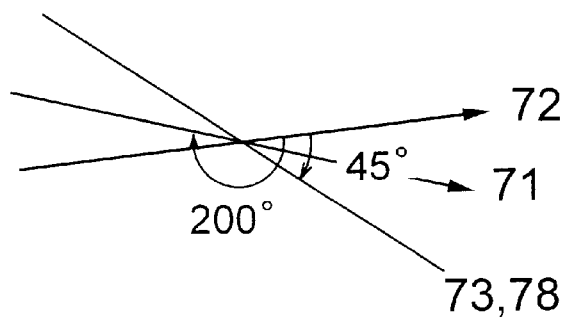
FIG. 28 is a graph showing relation between a slow axis direction of a phase plate and an alignment direction of liquid crystal of a liquid crystal display according to a fourth cited reference.
Figure 29:
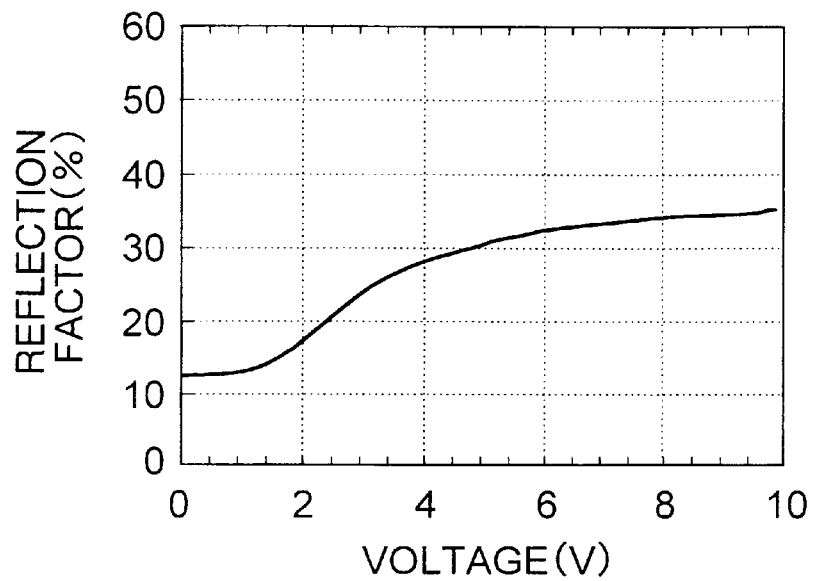
FIG. 29 is a graph showing a chromaticity of dark representation of a liquid crystal display according to a first cited reference.

In the liquid crystal displays of the first embodiment, the azimuth of the slow axis of the phase plate is set at 45 degrees clockwise against the alignment direction of the closer liquid crystal layer as shown in FIG. 28.

In measuring the dependency of a reflection factor on an applied voltage, the fourth cited reference provides the normally close type dependency on the applied voltage, in which the reflection factor at the applied voltage of 8 V is 25.5%, the reflection factor at the applied voltage of 0 V is 12.0%, and the contrast ratio is 2.2:1.

If the twist angle of the liquid crystal layer is zero, the ordinary ray in incidence can be converted into the extraordinary ray after reflection even if the angle formed by the slow axis of the phase plate and the alignment direction of the liquid crystal is 45 degrees clockwise or counterclockwise. However, if the liquid crystal layer has a twist alignment, it is necessary to set an angle formed by the slow axis of the phase plate and the closer liquid crystal alignment direction according to the twisting direction.

Since the angle formed by the slow axis of the phase plate and the liquid crystal alignment direction is 45 degrees clockwise, the ordinary ray in incidence is not converted into the extraordinary ray after reflection. As a result, the reflection factor of the dark representation is not sufficiently reduced, so that the contrast ratio is made lower.

Fifth Cited Reference

In the liquid crystal displays of the eighth embodiment, the alignment directions of the third and the fourth alignment layers are shifted by 30 degrees clockwise.

At this time, the twist angle of the second liquid crystal layer, the helical pitch, and the twisting direction are kept the same as those of the eighth embodiment. However, the alignment directions of the first and the second liquid crystal layers are not made parallel to each other on their closer surface to each other. Likewise, the alignment directions of the second and the third liquid crystal layers are not made parallel to each other on the closer surfaces to each other.

In measuring the display characteristics with the same method as the first embodiment, the reflection factor given in applying a voltage of 8 V to each liquid crystal layer is 54.5%, the reflection factor given by applying a voltage of 0 V is 16.8%, and the contrast ratio is 3.2:1.

As described above, the alignment directions of the first and the second liquid crystal layers are not made parallel to each other on the closer surfaces to each other. So are the alignment directions of the second and the third liquid crystal layers. Hence, when the extraordinary ray and the ordinary ray in the first liquid crystal layer pass through the second liquid crystal layer, those rays are mixed. This results in making it impossible to do polarization to be intended by the present invention, thereby lowering the contrast ratio.

Sixth Cited Reference

In the liquid crystal displays of the eighth embodiment, the thickness of the second liquid crystal layer is set at 20 $\mu$m. The addition of dye to the second liquid crystal layer is about one third of that of the fifth embodiment and the amount of dye is substantially same as that of the eighth embodiment. Hence, the helical pitches of the first and the third liquid crystal layers are set to about 11 $\mu$m, while the helical pitch of the second liquid crystal layer is set at 36 $\mu$m.

In measuring the display characteristics with the same method as that of the first embodiment, the reflection factor given in applying a voltage of 8 V to each liquid crystal layer is 62.3%, the reflection factor at the applied voltage of 0 V is 14.6%, and the contrast ratio is 4.3:1. The hue in the dark representation (applied voltage of 0 V) is (u, v)=(0.262, 0.521) in the CIS calorimetric system and is colored in yellow.

Assuming that the helical pitch of the second liquid crystal layer is 36 $\mu$m, the retardation of the phase plate required for converting the ordinary ray in incidence into the extraordinary ray after reflection is about 110 $\mu$m. On the other hand, since the retardation of the phase plate is about 70 μm, about the second liquid crystal layer, the ordinary ray in incidence cannot be converted into the extraordinary ray after reflection. Hence, the yellow cannot be sufficiently absorbed, which leads to lowering the contrast ration and coloring the dark representation.

In order to convert the ordinary ray in incidence into the extraordinary ray after reflection about each liquid crystal layer through the effect of the same phase plate, it is necessary to keep the helical pitch of each liquid crystal layer substantially equal to each other.

Seventh Cited Reference

In the liquid crystal displays of the first embodiment, the twist angle of the liquid crystal layer is zero. Further, the two phase plate is two-layered, concretely, the first and the second phase plates viewed from the closer side to the liquid crystal layer. The retardation of the first phase plate is set as a half wave. The retardation of the second phase plate is set as a quarter wave. The azimuth of the slow axis of the first phase plate is set at 22.5 degrees clockwise against the alignment direction of the closer liquid crystal layer. The azimuth of the slow axis of the second phase plate is set to be in parallel to the alignment direction of the closer liquid crystal layer.

Figure 31:
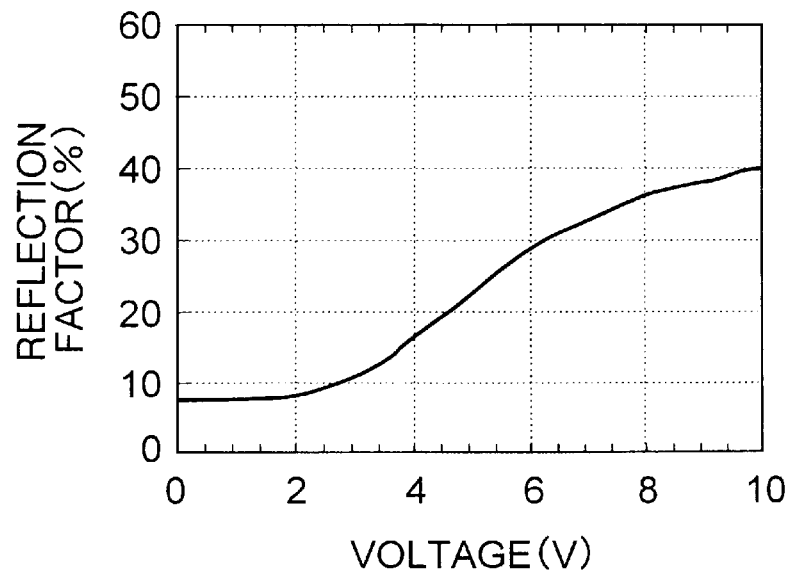
FIG. 31 is a graph showing dependency of an applied voltage on a reflection factor of a liquid crystal display according to a seventh cited reference.

The seventh cited reference provides the normally close type dependency on the applied voltage as shown in FIG. 31, in which the reflection factor given at the applied voltage of 8 v is 36.2%, the reflection factor given at the applied voltage of 0 V is 8.4%, and the contrast ratio is 4.3:1.

In comparing the graph of FIG. 31 with the dependency on the applied voltage (see FIG. 19) of the first embodiment, the threshold value is shifted to a high voltage side. The reflection factor at each voltage is made lower accordingly. The combination of a half wave plate with a quarter wave plate makes it possible to reduce the coloring in the dark representation. However, the total thickness of two phase plates reaches about six times as thick a thickness as the phase plate of the present invention. Hence, the influence of the voltage drop of the liquid crystal layer resulting from the phase plate is made so great that the reflection factor and the contrast ratio at the applied voltage of 8 V is made lower. For suppressing the influence of the voltage drop to a minimum and reducing the coloring in the dark representation, as described with respect to the present invention, it is necessary to make the liquid crystal aligned in a twisted manner and set the retardation of the phase plate according to the pitch of the twist alignment.

The foregoing embodiments of the present invention make it possible to solve the coloring and be energy-effective in the retardation film type guest host reflective liquid crystal displays.

What is claimed is:

1. An active matrix liquid crystal display comprising:
   a first substrate;
   a second substrate;
   a liquid crystal layer containing dichroic dye and laid between said first and second substrates;
   said first substrate having a common electrode formed on a closer surface thereof to said liquid crystal layer, and said common electrode having an alignment layer formed thereon;
   said second substrate having reflective pixel electrodes formed on a closer surface thereof to said liquid crystal layer, a plurality of active elements connected to said reflective pixel electrodes, a phase plate formed among said reflective pixel electrodes and said liquid crystal layer, and an alignment layer formed between said phase plate and said liquid crystal layer;
   said liquid crystal layer having a twist alignment; and
   said phase plate having a retardation being set as a half of a retardation between an ordinary ray in incidence in an optical path and an extraordinary ray after reflection by said reflective pixel electrodes in said optical path, and a slow axis being set at about 45 degrees reversely to the twisting direction of said liquid crystal layer from the alignment direction of a closer alignment layer.

2. A liquid crystal display as claimed in claim 1, wherein said first or said second substrate includes a color filter.

3. An active matrix liquid crystal display comprising:
   a first substrate;
   a second substrate;
   a third substrate;
   a fourth substrate;
   a first, a second, and a third liquid liquid crystal layers having twist alignments;
   said first liquid crystal layer laid between said first and second substrates;
   said second liquid crystal layer laid between said second and third substrates;
   said third liquid crystal layer laid between said third and said fourth substrates;
   said first substrate having a common electrode formed on a closer surface thereof to said first liquid crystal layer, said common electrode having an alignment layer contacting with said first liquid crystal layer formed thereon;
   said second substrate having pixel electrodes formed on a closer surface thereof to said first liquid crystal layer, active elements connected to said pixel electrodes, a common electrode formed on a closer surface thereof to said second liquid crystal layer, and an alignment layer contacting said second liquid crystal layer, formed on said common electrode;
   said third substrate having pixel electrodes formed on a closer surface thereof to said second liquid crystal layer, active elements connected to said pixel electrodes, a common electrode formed on a closer surface thereof to said third liquid crystal layer, and an alignment layer contacting with said third liquid crystal layer, formed on said common electrode;
   said fourth substrate having reflective electrodes formed on a closer surface thereof to said third liquid crystal layer, active elements connected to said reflective electrodes, and a phase plate formed between said reflective electrodes and said third liquid crystal layer;
   said first, said second, and said third liquid crystal layers containing dichroic dye;
   said first, said second, and said third liquid crystal layers having their helical pitches and twisting directions being equal to one another;
   said first liquid crystal layer having the same alignment direction on a closer side to said second liquid crystal layer as the closer side of said second liquid crystal layer to said first liquid crystal layer;
   said second liquid crystal layer having the same alignment direction on a closer side to said third liquid crystal layer as the closer side of said second liquid crystal layer to said second liquid crystal layer;
   said phase plate having a retardation being set at a half of a retardation between an ordinary ray in incidence in an optical path and an extraordinary ray after reflection by said reflective electrode in said optical path, and said phase plate having a slow axis being set at about 45 degrees reversely to the twisting direction of said liquid crystal layer, from the alignment direction of a closer alignment layer.

4. A liquid crystal display as claimed in claim 1 or 3, wherein said phase plate has a smaller retardation than a quarter wave.

5. A liquid crystal display as claimed in claim 1 or 3, wherein the helical pitch of said liquid crystal layer ranges from 16 μm to 20 μm and the retardation of said phase plate ranges from 60 nm to 110 nm.

6. A liquid crystal display as claimed in claim 1 or 3, wherein the helical pitch of said liquid crystal layer ranges from 12 μm to 16 μm and the retardation of said phase plate ranges from 55 nm to 100 nm.

7. A liquid crystal display as claimed in claim 1 or 3, wherein the helical pitch of said liquid crystal layer ranges from 10 μm to 12 μm and the retardation of said phase plate ranges from 45 nm to 90 nm.

8. A liquid crystal display as claimed in claim 1 or 3, wherein the helical pitch of said liquid crystal layer ranges from 8 μm to 10 μm and the retardation of said phase plate ranges from 35 nm to 80 nm.

9. A liquid crystal display as claimed in claim 1 or 3, wherein the helical pitch of said liquid crystal layer ranges from 6 μm to 8 μm and the retardation of said phase plate ranges from 25 nm to 65 nm.

10. A liquid crystal display as claimed in claim 1 or 3, wherein the helical pitch P of said liquid crystal layer and the retardation Δ of said phase plate are located in an area enclosed by the following (1) and (II) expressions:

$$7.5 \leq P \leq 18 \tag{I}$$

$$40.0 \ln(P) - 55.6 \leq \Delta \leq 51.4 \ln(P) - 38.5 \tag{II}$$

\* \* \* \* \*